United States Patent
Choi

(10) Patent No.: US 9,703,487 B2
(45) Date of Patent: Jul. 11, 2017

(54) MEMORY SYSTEM AND OPERATION METHOD FOR THE SAME

(71) Applicant: SK hynix Inc., Gyeonggi-do (KR)

(72) Inventor: Hae-Gi Choi, Gyeonggi-do (KR)

(73) Assignee: SK Hynix Inc., Gyeonggi-do (KR)

( * ) Notice: Subject to any disclaimer, the term of this patent is extended or adjusted under 35 U.S.C. 154(b) by 52 days.

(21) Appl. No.: 15/009,261

(22) Filed: Jan. 28, 2016

(65) Prior Publication Data
US 2017/0060424 A1 Mar. 2, 2017

(30) Foreign Application Priority Data
Aug. 26, 2015 (KR) .................. 10-2015-0120066

(51) Int. Cl.
*G06F 3/06* (2006.01)
(52) U.S. Cl.
CPC .......... *G06F 3/0604* (2013.01); *G06F 3/0653* (2013.01); *G06F 3/0679* (2013.01)
(58) Field of Classification Search
CPC ..... G06F 3/0604; G06F 3/0653; G06F 3/0679
See application file for complete search history.

(56) References Cited

U.S. PATENT DOCUMENTS

2013/0326096 A1 12/2013 Cohen et al.

*Primary Examiner* — David X Yi
*Assistant Examiner* — Zubair Ahmed
(74) *Attorney, Agent, or Firm* — IP & T Group LLP

(57) ABSTRACT

A memory system includes: a non-volatile memory device; and a controller for checking operation information of a requested ISP operation, performing a first ISP operation when the requested ISP operation is not requested in the past, and performing a second ISP operation when the requested ISP operation is also requested in the past. During the first ISP operation, the controller may read out two or more requested data from the non-volatile memory device in response to the operation information of the requested ISP operation, generate resultant data by performing a predetermined operation to the read-out requested data, output the resultant data to a host, and store the resultant data in the non-volatile memory device. During the second ISP operation, the controller may read out the resultant data corresponding to the requested ISP operation from the non-volatile memory device, and output the read-out resultant data to the host.

20 Claims, 14 Drawing Sheets

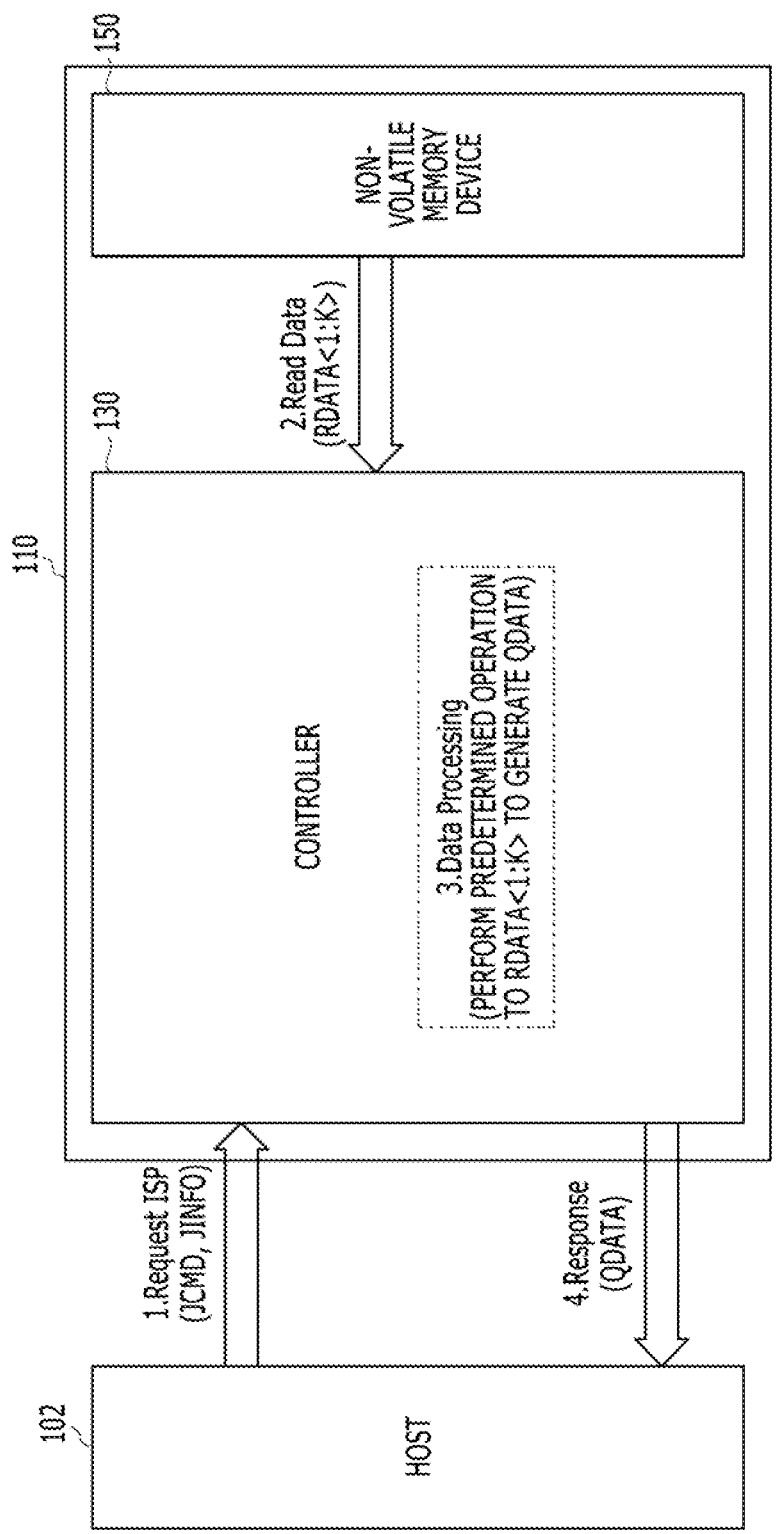

MEMORY SYSTEM AND OPERATION METHOD FOR THE SAME

CROSS-REFERENCE TO RELATED APPLICATION

This application claims priority under 35 U.S.C. §119 to Korean Patent Application No. 10-2015-0120066 filed on Aug. 26, 2015 in the Korean Intellectual Property Office, the disclosure of which is incorporated herein by reference in its entirety.

BACKGROUND

1. Field

Various exemplary embodiments of the present invention relate to semiconductor design technology and, more particularly, to a memory system having in-storage processing (ISP) and an operation method thereof.

2. Description of the Related Art

The computer environment paradigm has shifted to ubiquitous computing systems that can be used anytime and anywhere. As a result, use of portable electronic devices such as mobile phones, digital cameras, and notebook computers continues to increase rapidly. Portable electronic devices generally use a memory system having one or more semiconductor memory devices for storing data. Semiconductor memory devices referred to herein simply as memory devices may be used as a main memory device or an auxiliary memory device of a portable electronic device.

Semiconductor memory devices provide excellent stability, durability, high information access speed, and low power consumption, since unlike other type of storage devices they have no moving parts. Examples of semiconductor memory devices having such advantages include universal serial bus (USB) memory devices, memory cards having various interfaces, and solid state drives (SSD).

SUMMARY

Various embodiments of the present invention are directed to a memory system capable of efficiently performing in-storage processing (ISP) and an operation method thereof.

In an embodiment of the invention, a memory system may include: a non-volatile memory device; and a controller suitable for checking an operation information of a requested ISP operation by a host, and performing a first ISP operation when the requested ISP operation is not requested in the past, or performing a second ISP operation when the requested ISP operation is also requested in the past, wherein during the first ISP operation the controller reads out data from the non-volatile memory device according to the operation information of the requested ISP operation, generates a resulting data by performing a preset operation to the read-out data, outputs the resulting data to the host, and stores the resulting data in the non-volatile memory device, and wherein, during the second ISP operation the controller outputs the read-out resulting data corresponding to the requested ISP operation from the non-volatile memory device to the host.

The controller may cumulatively store the operation information as a cumulative operation information of the requested ISP operation during the first ISP operation. The controller may determine whether the requested ISP operation is also requested in the past by comparing the operation information of the requested ISP operation with the cumulative operation information.

The controller may cumulatively store the operation information as the cumulative operation information, of the ISP operation previously performed as the first ISP operation in response to previous request from the host prior to the requested ISP operation to a maximum number of N (N is an integer greater than 2).

When the part of the memory storing the cumulative operation information is full, the controller may delete the oldest hit operation information and stores the operation information of the requested ISP operation as the cumulative operation information during the first ISP operation.

The data may be stored in a first region of the non-volatile memory device. The controller may store the resulting data in a second region of the non-volatile memory device.

The controller may store the cumulative operation information in a preset storage space therein. The controller may back up the cumulative operation information stored in the preset storage space to a third region of the non-volatile memory device at power-off of the memory system.

The operation information of the requested ISP operation may include a process address information representing each location of the data in the non-volatile memory device, and a requested operation information representing a type of the preset operation corresponding to the requested ISP operation. Each of the cumulative operation information may further include a resulting address information representing each location of the resulting data in the non-volatile memory device.

The controller may determine whether the requested ISP operation is also requested in the past by comparing the process address information between the operation information of the requested ISP operation and the cumulative operation information, and selectively comparing the requested operation information between the operation information of the requested ISP operation and the cumulative operation information according to a result of the comparing of the process address information.

During the comparing of the process address information, the controller may determine that the process address information between the operation information of the requested ISP operation and the cumulative operation information have different values when numbers of the data represented by the process address information between the operation information of the requested ISP operation and the cumulative operation information is different from each other.

The preset operation may include: an operation of joining the read-out data together; and/or an operation of comparing the read-out data with one another.

In an embodiment of the present invention, an operation method of a memory system including a non-volatile memory device may include: checking an operation information of a requested ISP operation when a host provides a request of ISP operation; performing a first ISP operation when the requested ISP operation is not requested in the past as a result of the checking of the operation information; storing a resulting data of the first ISP operation in the non-volatile memory device; and performing a second ISP operation when the requested ISP operation is also requested in the past as a result of the checking of the operation information. The first ISP operation may include reading out data from the non-volatile memory device according to the operation information of the requested ISP operation, generating the resulting data by performing a preset operation to the read-out data, and outputting the resulting data to the host. The second ISP operation may include outputting the read-out resulting data corresponding to the requested ISP operation from the non-volatile memory device to the host.

The checking of the operation information may include: cumulatively storing the operation information, as a cumulative operation information, of the requested ISP operation during the first ISP operation; and determining whether the requested ISP operation is also requested in the past by comparing the operation information of the requested ISP operation with the cumulative operation information.

The cumulatively storing of the operation information may be performed by cumulatively storing the operation information, as the cumulative operation information, of the ISP operation, during which the resultant data is previously stored in the non-volatile memory device through the performing of the first ISP operation and the storing of the resultant data in response to previous request of the ISP operation from the host, prior to the requested ISP operation to a maximum number of N (N is an integer greater than 2).

When the part of the memory storing the cumulative operation information is full, the cumulatively storing of the operation information may delete the oldest hit one among the operation information in the cumulative operation information and may store the operation information of the requested ISP operation as the cumulative operation information during the first ISP operation.

The data may be stored in a first region of the nonvolatile memory device 150. The storing of the resulting data may be performed by storing the resulting data in a second region of the non-volatile memory device.

The cumulatively storing of the operation information may include: storing the cumulative operation information in a preset storage space other than the non-volatile memory device; and backing up the cumulative operation information stored in the preset storage space to a third region of the non-volatile memory device at power-off of the memory system.

The operation information of the requested ISP operation may include a process address information representing each location of the data in the non-volatile memory device, and a requested operation information representing a type of the preset operation corresponding to the requested ISP operation. Each of the cumulative operation information further may include a resulting address information representing each location of the resulting data in the non-volatile memory device.

The checking of the operation information may determine whether the requested ISP operation is also requested in the past by comparing the process address information between the operation information of the requested ISP operation and the cumulative operation information, and selectively comparing the requested operation information between the operation information of the requested ISP operation and the cumulative operation information according to a result of the comparing of the process address information.

During the comparing of the process address information, the checking of the operation information may determine that the process address information between the operation information of the requested ISP operation and the cumulative operation information have different values when numbers of the data represented by the process address information between the operation information of the requested ISP operation and the cumulative operation information is different from each other.

The preset operation may include: an operation of joining the read-out data together; and an operation of comparing the read-out data with one another.

In an embodiment of the present invention a memory system supporting in-storage processing (ISP) may detect a frequently performed ISP operation, and independently store resulting data of the detected ISP operation. Then, the memory system may simplify the ISP operation by read out the result data during the same ISP operation.

Therefore the memory system may greatly reduce operation time for the frequently repeated ISP operation.

BRIEF DESCRIPTION OF THE DRAWINGS

FIGS. 12A to 12C are block diagrams illustrating an in-storage processing (ISP) operation of a memory system in an exemplary embodiment of the present invention.

DETAILED DESCRIPTION

Figure 1:
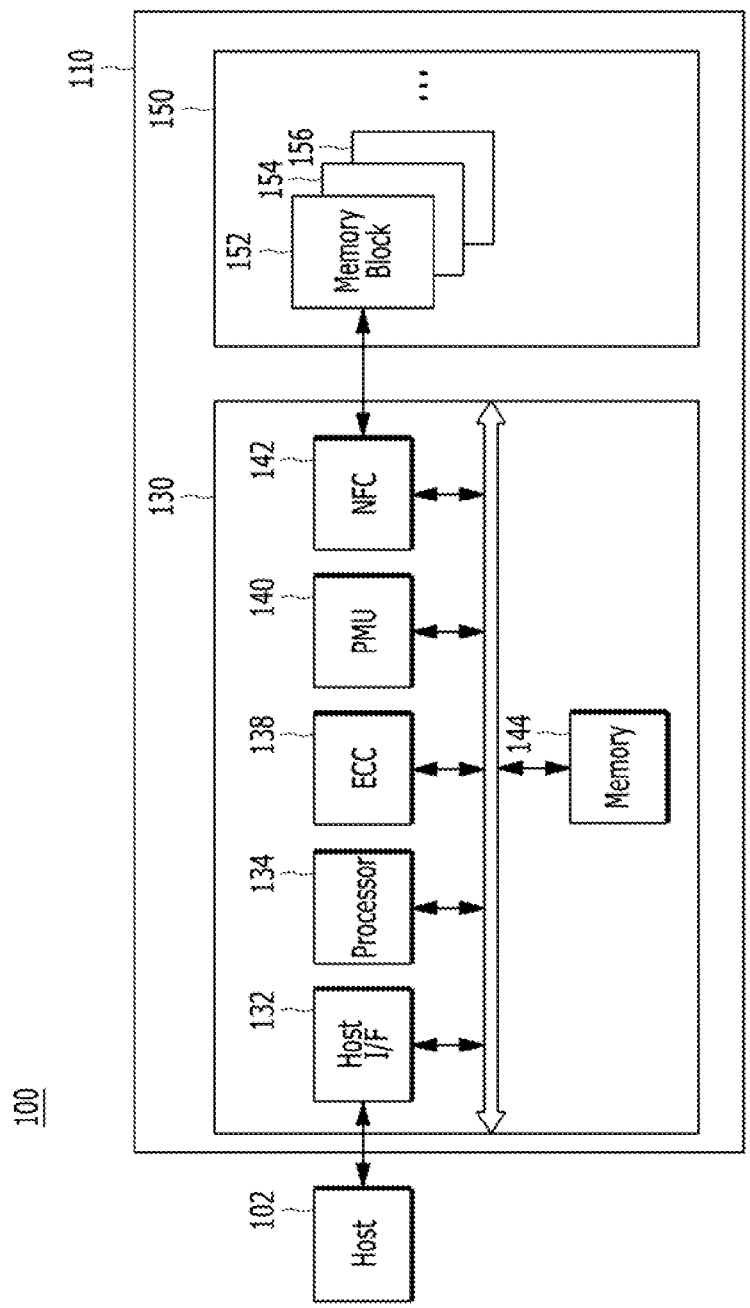
FIG. 1 is a diagram illustrating a data processing system including a memory system in an embodiment.

Various embodiments will be described with reference to the accompanying drawings. It is noted, however, that the present invention may, be embodied in different forms and should not be construed as being limited to the embodiments set forth herein. Rather, these embodiments are provided so that this disclosure will be thorough and complete. The drawings are not necessarily to scale and in some instances, proportions may have been exaggerated in order to clearly illustrate features of the embodiments. Throughout the disclosure, same reference numerals are used to correspond to like parts in the various figures and embodiments of the present invention. It is noted that in this specification, "connected/coupled" refers to one component not only directly coupling another component but indirectly coupling another component through an intermediate component. In addition, a singular form may include a plural form as long as it is not specifically mentioned otherwise in a sentence. It should be readily understood that the meaning of "on" and "over" in the present disclosure should be interpreted in the broadest manner such that "on" means not only "directly on" but "on" something with an intermediate feature(s) or a layer(s) therebetween, and that "over" means not only directly on top but on top of something with an intermediate feature(s) or a layer(s) therebetween. When a first layer is referred to as being "on" a second layer or "on" a substrate, it not only refers to a case where the first layer is formed directly on the second layer or the substrate but a case where a third layer exists between the first layer and the second layer or the substrate.

Referring to FIG. 1, a data processing system 100 is provided, according to an embodiment of the invention. The data processing system 100 may include a host 102 and a memory system 110.

The host 102 may include any suitable electronic device. For example the host 102 may include a portable electronic device such as a mobile phone, an MP3 player, a laptop computer and the like. The host may include a non-portable electronic device such as a desktop computer, a game player, a TV a projector and the like.

The memory system 110 may operate in response to a request from the host 102. For example, the memory system may store data to be accessed by the host 102 The memory system 110 may be used as a main memory system or an auxiliary memory system of the host 102. The memory system 110 may be implemented with any suitable storage device, according to the protocol of a host interface electrically coupled with the host 102 One or more semiconductor memory devices may be used. Volatile or non-volatile memory devices may be used. For example, the memory system 110 may be implemented with a solid state drive (SSD), a multimedia card (MMC), an embedded MMC (eMMC), a reduced size MMC (RS-MMC) and a micro-MMC, a secure digital (SD) card, a mini-SD and a micro-SD, a universal serial bus (USB) storage device, a universal flash storage (UFS) device, a compact flash (CF) card, a smart media (SM) card, a memory stick, and the like.

The storage devices for the memory system 110 may be implemented with a volatile memory device, such as a dynamic random access memory (DRAM) and a static random access memory (SRAM) or a nonvolatile memory device such as a read only memory (ROM), a mask ROM (MROM), a programmable ROM (PROM), an erasable programmable ROM (EPROM), an electrically erasable programmable ROM (EEPROM), a ferroelectric random access memory (FRAM), a phase change RAM (PRAM), a magnetoresistive RAM (MRAM), a resistive RAM (RRAM) and the like.

The memory system 110 may include a memory device 150 which stores data to be accessed by the host 102, and a controller 130 which may control storage of data in the memory device 150.

The controller 130 and the memory device 150 may be integrated into a single semiconductor device. For instance, the controller 130 and the memory device 150 may be integrated into one semiconductor device configured as a solid state drive (SSD). Configuring the memory system 110 as an SSD, may generally allow a significant increase in the operation speed of the host 102.

The controller 130 and the memory device 150 may be integrated into a single semiconductor device configured as a memory card, such as a Personal Computer Memory Card International Association (PCMCIA) card, a compact flash (CF) card, a smart media (SM) card (SMC), a memory stick, a multimedia card (MMC), an RS-MMC and a micro-MMC, a secure digital (SD) card, a mini-SD, a micro-SD and an SDHC, a universal flash storage (UFS) device and the like.

Also, for example, the memory system 110 may be or configure a computer, an ultra-mobile PC (UMPC), a workstation a net-book, a personal digital assistant (PDA) a portable computer, a web tablet, a tablet computer, a wireless phone a mobile phone a smart phone, an e-book, a portable multimedia player (PMP), a portable game player, a navigation device, a black box, a digital camera, a digital multimedia broadcasting (DMB) player, a three-dimensional (3D) television, a smart television, a digital audio recorder, a digital audio player, a digital picture recorder, a digital picture player, a digital video recorder, a digital video player, a storage configuring a data center, a device capable of transmitting and receiving information under a wire less environment, one of various electronic devices configuring a home network, one of various electronic devices configuring a computer network, one of various electronic devices configuring a telematics network, an RFID device, or one of various component elements configuring a computing system.

The memory device may store data provided from the host 102 during a write operation, and provide the stored data to the host 102 during a read operation. The memory device 150 may include one or more memory blocks 152, 154 and 156. Each of the memory blocks 152, 154 and 156 may include a plurality of pages. Each of the pages may include a plurality of memory cells to which a plurality of word lines (WL) may be electrically coupled. The memory device 150 may be a nonvolatile memory device retaining stored data when power supply is interrupted. According to an embodiment the memory device may be a flash memory. The memory device may be a flash memory device having a three-dimensional (3D) stack structure. An example of a non-volatile memory device 150 having a three-dimensional (3D) stack structure is described later herein with reference to FIGS. 2 to 11.

The controller 130 of the memory system 110 may control the memory device 150 in response to a request from the host 102. The controller 130 may provide data read from the memory device 150, to the host 102, and store the data provided from the host 102 into the memory device 150. To this end, the controller 130 may control overall operations of the memory device 150, such as read, write, program and erase operations.

Any suitable controller may be used. For example, the controller 130 may include a host interface unit 132, a processor 134, an error correction code (ECC) unit 138, a power management unit 140, a NAND flash controller 142, and a memory 144.

The host interface unit 132 may process commands and/or data provided from the host 102. The host interface unit 132 may communicate with the host 102 through at least one of various interface protocols such as universal serial bus (USB), multimedia card (MMC), peripheral component interconnect-express (PCI-E), serial attached SCSI (SAS), serial advanced technology attachment (SATA), parallel advanced technology attachment (PATA), small computer system interface (SCSI), enhanced small disk interface (ESDI) integrated drive electronics (IDE) and the like.

The ECC unit 138 may detect and correct errors in the data read from the memory device 150 during a read operation. Various detection and correction techniques may be employed. For example, the ECC unit 138 may not correct error bits when the number of the error bits is greater than or equal to a threshold number of correctable error bits, and may output an error correction fail signal indicating failure in correcting the error bits.

The ECC unit 138 may perform an error correction operation based on a coded modulation such as a low density parity check (LDPC) code, a Bose-Chaudhuri-Hocquenghem (BCH) code, a turbo code, a Reed-Solomon (RS) code, a convolution code, a recursive systematic code (RSC), a trellis-coded modulation (TCM), a Block coded modulation (BCM), and the like. The ECC unit 138 may include any and all suitable circuits, systems or devices required for an error detection and correction operation.

The PMU 140 may provide and manage power for the controller 130, that is, power for the component elements included in the controller 130.

The NFC 142 may serve as a memory interface between the controller 130 and the memory device 150 to allow the controller 130 to control the memory device 150 in response to a request from the host 102. The NFC 142 may generate control signals for the memory device 150. The NFC may process data under the control of the processor 134 for example when the memory device 150 is a flash memory and in particular, when the memory device 150 is a NAND flash memory.

The memory 144 may serve as a working memory of the memory system 110 and the controller 130, and store data for driving the memory system 110 and the controller 130. The controller 130 may control the memory device 150 in response to a request from the host 102. For example, the controller 130 may provide the data read from the memory device 150 to the host 102 and store the data provided from the host 102 in the memory device 150. When the controller 130 controls the operations of the memory device 150, the memory 144 may store data used by the controller 130 and the memory device 150 for such operations as read, write, program and erase operations.

The memory 144 may be implemented with volatile memory. For example, the memory 144 may be implemented with a static random access memory (SRAM) or a dynamic random access memory (DRAM). As described above, the memory 144 may store data used by the host 102 and the memory device 150 for the read and write operations. To store the data, the memory 144 may include a program memory, a data memory, a write buffer, a read buffer, a map buffer, and so forth.

The processor 134 may control one or more general operations of the memory system 110. The processor 134 may control a write operation or a read operation for the memory device 150, in response to a write request or a read request from the host 102. The processor 134 may drive firmware, which is referred to as a flash translation layer (FTL), to control the general operations of the memory system 110. The processor 134 may be implemented with a microprocessor. The processor may be implemented with a central processing unit (CPU).

A management unit (not shown) may be included in the processor 134, and may perform, for example, bad block management of the memory device 150. Accordingly, the management unit may find bad memory blocks included in the memory device 150, which are in unsatisfactory condition for further use, and perform bad block management on the bad memory blocks. When the memory device 150 is a flash memory, for example, a NAND flash memory, a program failure may occur during a write operation due to characteristics of a NAND logic function. Bad block management may program the data of the program-failed memory block or the bad memory block into a new memory block. Bad blocks due to a program fail may deteriorate the utilization efficiency of a memory device, especially one having a 3D stack structure and thus negatively affect the reliability of the memory system 100.

Figure 2:
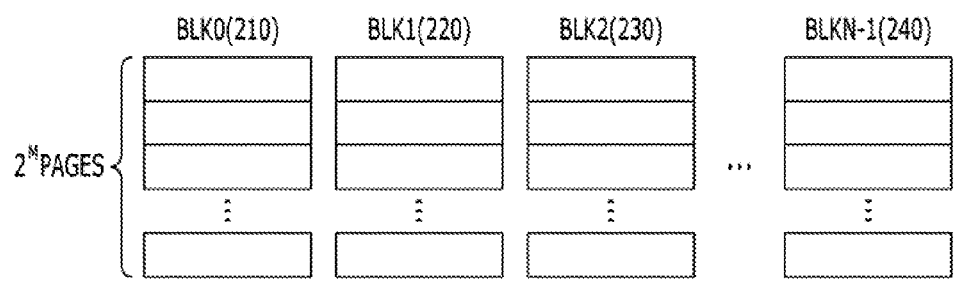
FIG. 2 is a diagram illustrating a memory device in the memory system shown in FIG. 1.

Referring to FIG. 2, according to an embodiment, the memory device 150 may include a plurality of memory blocks, for example, zeroth to (N-1)$^{th}$ blocks 210 to 240. Each of the plurality of memory blocks 210 to 240 may include a plurality of pages, for example, $2^M$ number of pages ($2^M$ PAGES). Each of the plurality of pages may include a plurality of memory cells to which a plurality of word lines are electrically coupled.

The memory blocks may be single level cell (SLC) memory blocks or multi-level cell (MLC) memory blocks, according to the number of bits which may be stored or expressed in each memory cell. The SLC memory block may Include a plurality of pages which are implemented with memory cells each capable of storing 1-bit data. The MLC memory block may include a plurality of pages which are implemented with memory cells each capable of storing multi-bit data, for example, two or more-bit data. A MLC memory block including a plurality of pages which are implemented with memory cells that are each capable of storing 3-bit data may be employed and will be referred to as a triple level cell (TLC) memory block.

Each of the plurality of memory blocks 210 to 240 may store data provided from the host device 102 during a write operation, and may provide stored data to the host 102 during a read operation.

Figure 3:
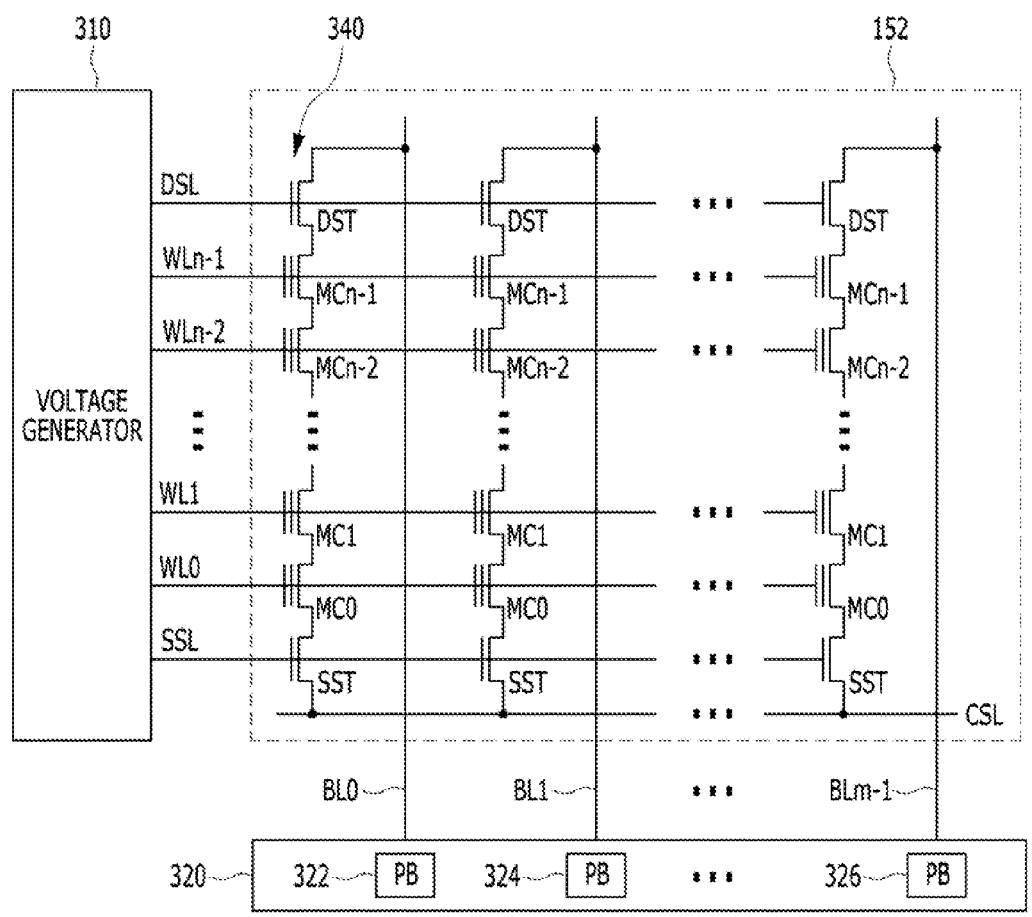
FIG. 3 is a circuit diagram illustrating a memory block in a memory device in an embodiment.

Referring to FIG. 3, a memory block 152 of the memory device 150 may include a plurality of cell strings 340 which are electrically coupled to bit lines BL0 to BLm-1, respectively. The cell string 340 of each column may include at least one drain select transistor DST and at least one source select transistor SST. A plurality of memory cells or a plurality of memory cell transistors MC0 to MCn-1 may be electrically coupled in series between the select transistors DST and SST. The respective memory cells MC0 to MCn-1 may be configured by multi-level cells (MLC) each of which stores data information of a plurality of bits. The strings 340 may be electrically coupled to the corresponding bit lines BL0 to BLm-1, respectively. For reference, in FIG. 3, 'DSL' denotes a drain select line, 'SSL' denotes a source select line, and 'CSL' denotes a common source line.

While the memory block 152 is configured by NAND flash memory cells, it is to be noted that the memory block 152 may be realized, in other embodiments by NOR flash memory, hybrid flash memory in which at least two kinds of memory cells are combined, or one-NAND flash memory in which a controller is built in a memory chip. Also, the operational characteristics of a semiconductor device may be applied to not only a flash memory device in which a charge storing layer is configured by conductive floating gates but also to a charge trap flash (CTF) in which a charge storing layer is configured by a dielectric layer.

A voltage supply block 310 of the memory device 150 may provide word line voltages, for example, a program voltage, a read voltage or a pass voltage, to be supplied to respective word lines according to an operation mode. The voltage supply block 310 may provide voltages to be supplied to bulks, for example, well regions in which the memory cells are formed. The voltage supply block 310 may perform a voltage generating operation under the control of a control circuit (not shown). The voltage supply block 310 may generate a plurality of variable read voltages to generate a plurality of read data select one of the memory blocks or sectors of a memory cell array under the control of the control circuit, select one of the word lines of the selected memory block, and provide the word line voltages to the selected word line and unselected word lines.

A read/write circuit 320 of the memory device 150 may be controlled by the control circuit, and may serve as a sense amplifier or a write driver according to an operation mode. During a verification/normal read operation, the read/write circuit 320 may serve as a sense amplifier for reading data from the memory cell array. Also, during a program operation, the read/write circuit 320 may serve as a write driver which drives bit lines according to data to be stored in the memory cell array. The read/write circuit 320 may receive data to be written in the memory cell array, from a buffer (not shown), during the program operation, and may drive the bit lines according to the inputted data. To this end, the read/write circuit 320 may include a plurality of page buffers 322, 324 and 326 respectively corresponding to columns (or bit lines) or pairs of columns (or pairs of bit lines), and a plurality of latches (not shown) may be included in each of the page buffers 322, 324 and 326.

FIGS. 4 to 11 are schematic diagrams illustrating various aspects of a memory device 150.

As shown in FIGS. 4 to 11, the memory device 150 may include a plurality of memory blocks BLK0 to BLKN-1 and each of the memory blocks BLK0 to BLKN-1 may be realized in a three-dimensional (3D) structure or a vertical structure. The respective memory blocks BLK0 to BLKN-1 may include structures which extend in first to third directions, for example, an x-axis direction, a y-axis direction and a z-axis direction.

Figure 8:
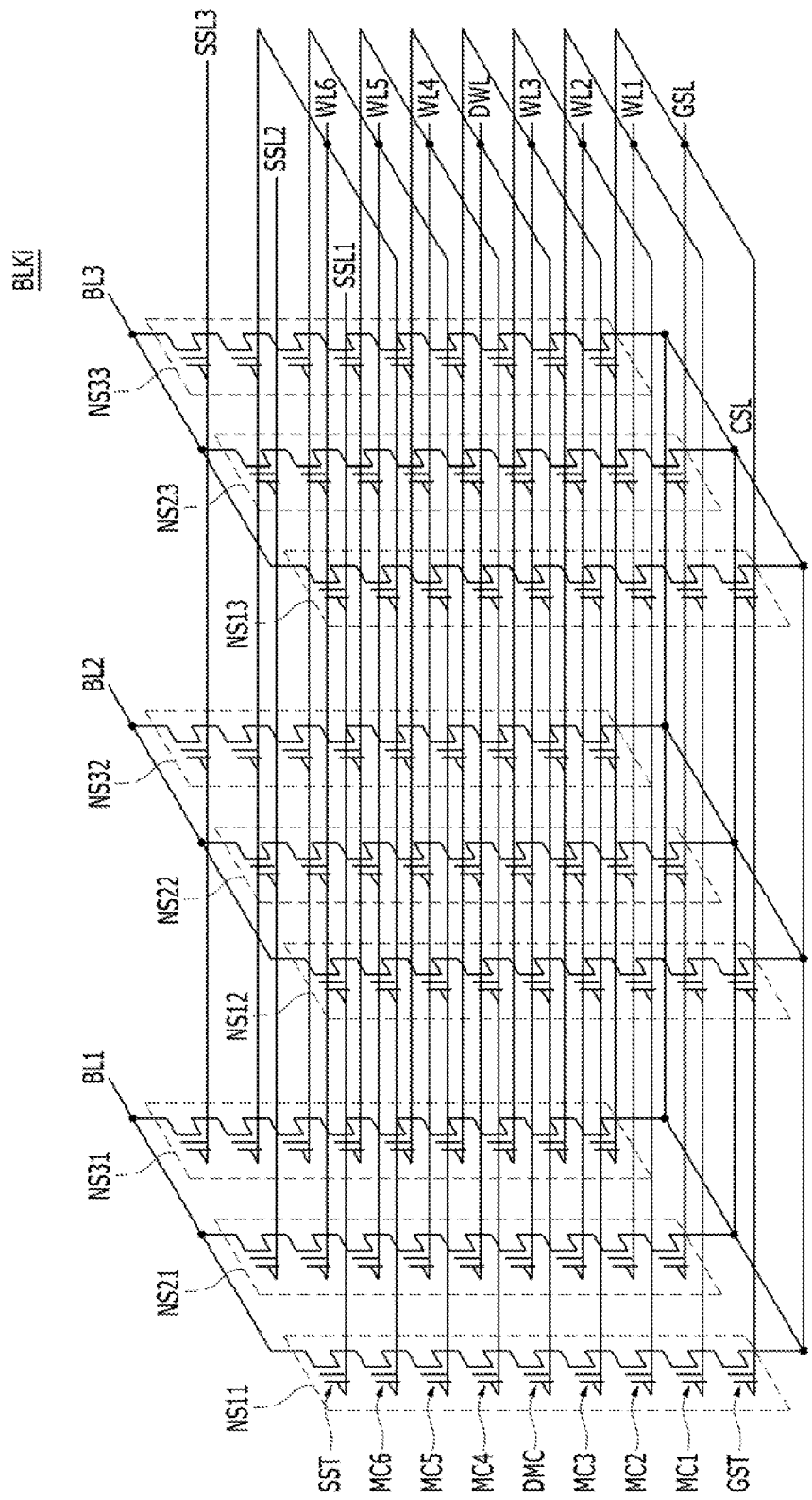

The respective memory blocks BLK0 to BLKN-1 may include a plurality of NAND strings NS which extend in the second direction (FIG. 8). The plurality of NAND strings NS may be provided in the first direction and the third direction. Each NAND string NS may be electrically coupled to a bit line BL, at least one source select line SSL, at least one ground select line GSL, a plurality of word lines WL, at least one dummy word line DWL, and a common source line CSL. The respective memory blocks BLK0 to BLKN-1 may be electrically coupled to a plurality of bit lines BL, a plurality of source select lines SSL, a plurality of ground select lines GSL, a plurality of word lines WL, a plurality of dummy word lines DWL and a plurality of common source lines CSL.

Figure 4:
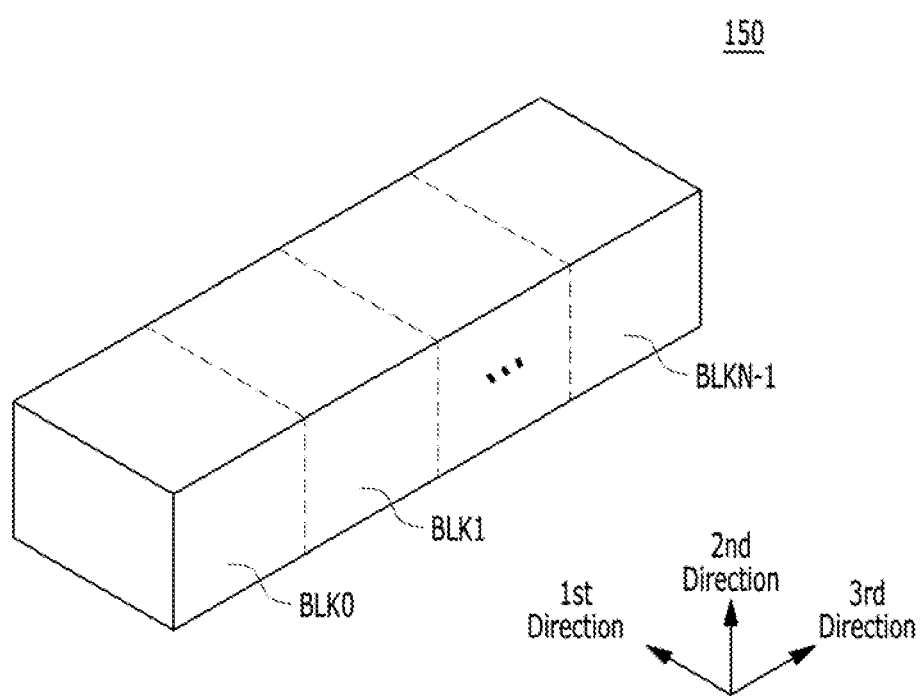
FIGS. 4 to 11 are diagrams schematically illustrating the memory device shown in FIG. 2.
Figure 5:
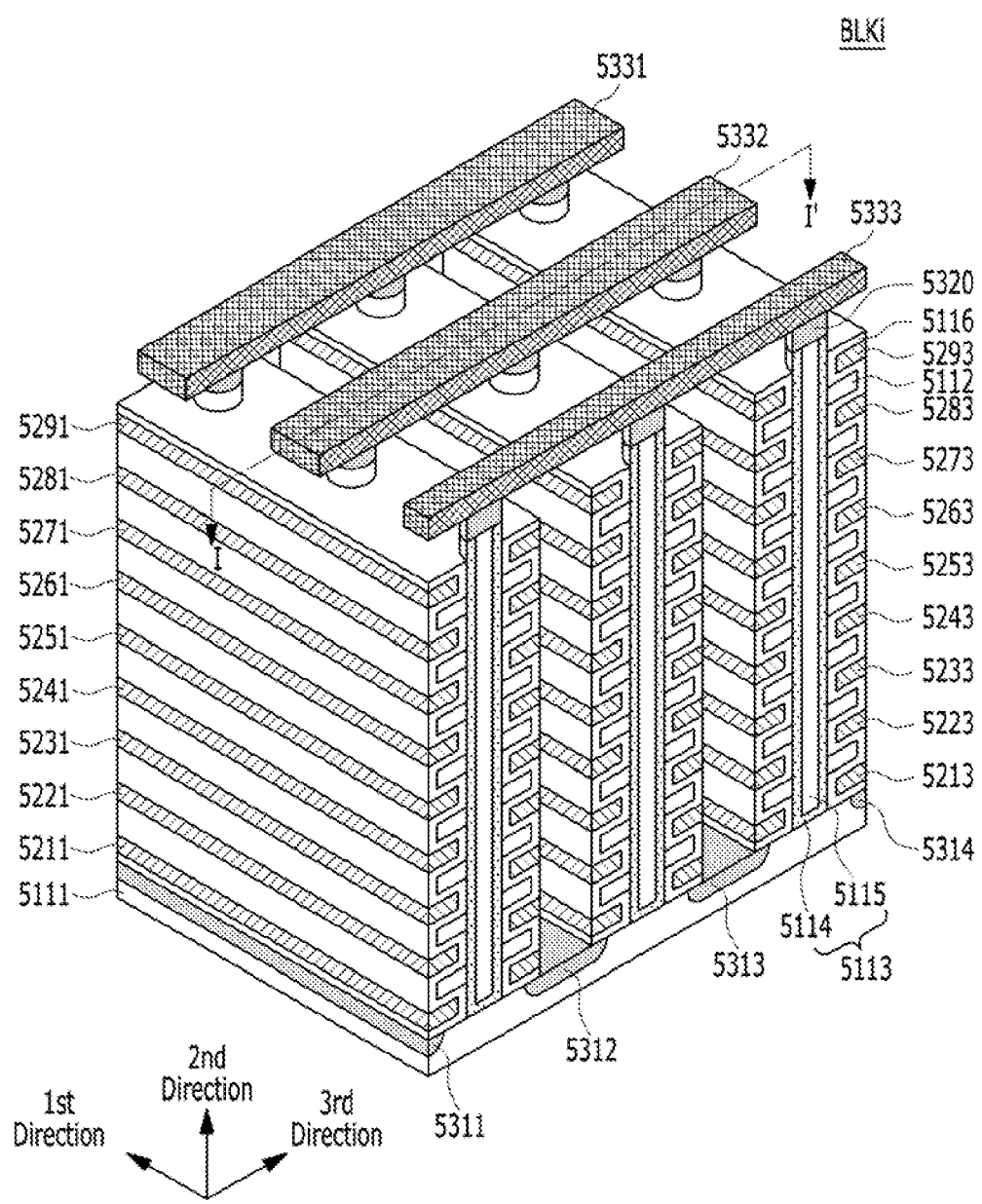
Figure 6:
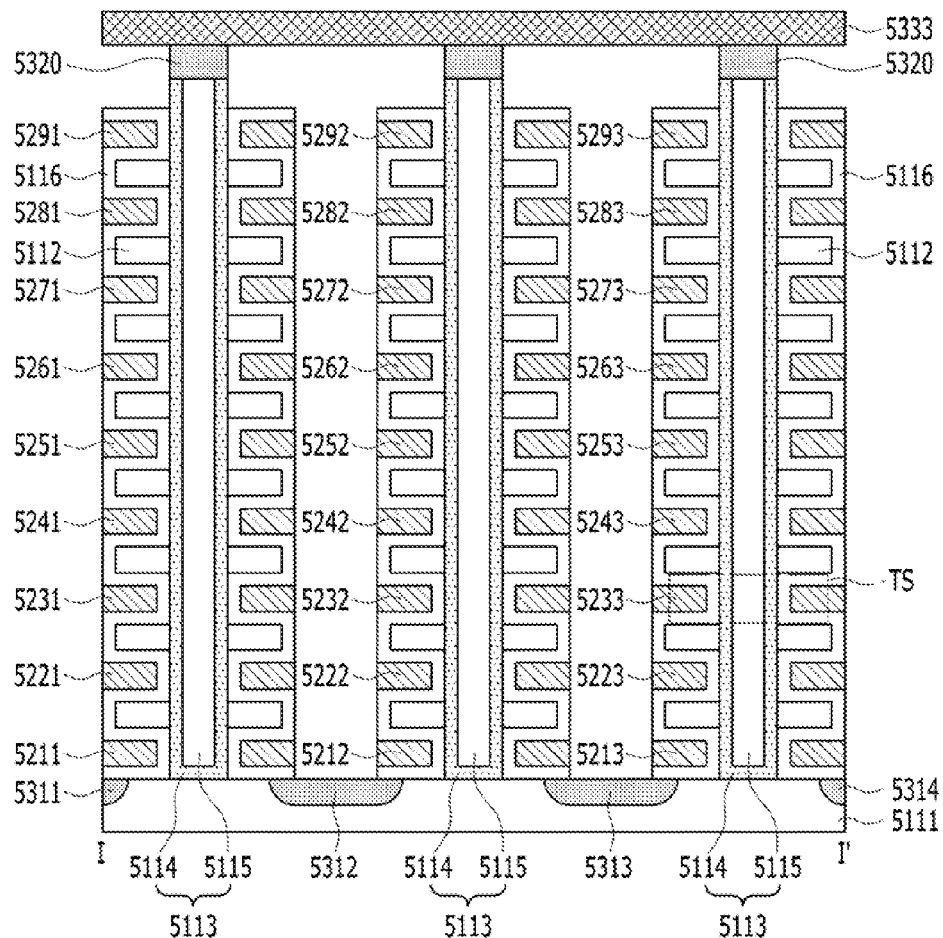

FIG. 5 is a perspective view of one memory block BLKi of the plurality memory blocks BLK0 to BLKN-1 shown in FIG. 4. FIG. 6 is a cross-sectional view taken along a line I-I' of the memory block BLKi shown in FIG. 5.

Referring to FIGS. 5 and 6, memory block BLKi may include a structure which extends in the first to third directions.

The memory block may include a substrate 5111 including a silicon material doped with a first type impurity. For example, the substrate 5111 may include a silicon material doped with a p-type impurity or may be a p-type well, for example, a pocket p-well, and include an n-type well which surrounds the p-type well. While in the embodiment shown it is assumed that the substrate 5111 is p-type silicon, it is to be noted that the substrate 5111 is not limited to being p-type silicon.

A plurality of doping regions 5311 to 5314 which extend in the first direction may be provided over the substrate 5111. The doping regions are spaced apart at regular intervals in the third direction. The plurality of doping regions 5311 to 5314 may contain a second type of impurity that is different from the impurity used in substrate 5111. For example, the plurality of doping regions 5311 to 5314 may be doped with an n-type impurity. While it is assumed here that first to fourth doping regions 5311 to 5314 are n-type, it is to be noted that the first to fourth doping regions 5311 to 5314 are not limited to being n-type.

In the region over the substrate 5111 between the first and second doping regions 5311 and 5312, a plurality of dielectric material regions 5112 which extend in the first direction may be spaced apart at regular intervals in the second direction. The dielectric material regions 5112 and the substrate 5111 may also be separated from one another by a predetermined distance in the second direction. The dielectric material regions 5112 may include any suitable dielectric material such as, for example silicon oxide.

In the regions over the substrate 5111 between two consecutive doping regions, for example, between doping regions 5311 and 5312, a plurality of pillars 5113 are spaced apart at regular intervals in the first direction. The pillars 5113 extend in the second direction and may pass through the dielectric material regions 5112 so that they may be electrically coupled with the substrate 5111. Each pillar 5113 may include one or more materials. For example, each pillar 5113 may include an in inner layer 5115 and an outer surface layer 5114. The surface layer 5114 may include a doped silicon material doped with an impurity. For example, the surface layer 5114 may include a silicon material doped with the same or same type impurity as the substrate 5111. While it is assumed here, as an example, that the surface layer 5114 may include p-type silicon, the surface layer 5114 is not limited to being p-type silicon and other embodiments may readily envisaged by the skilled person wherein the substrate 5111 and the surface layer 5114 of the pillars 5113 may be doped with an n-type impurity.

The inner layer 5115 of each pillar 5113 may be formed of a dielectric material. The inner layer 5115 may be or include a dielectric material such as, for example, silicon oxide.

In the regions between the first and second doping regions 5311 and 5312, a dielectric layer 5116 may be provided along the exposed surfaces of the dielectric material regions 5112, the pillars 5113 and the substrate 5111. The thickness of the dielectric layer 5116 may be less than one half of the distance between the dielectric material regions 5112. In other words, a region in which a material other than the dielectric material 5112 and the dielectric layer 5116 may be disposed, may be provided between (i) the dielectric layer 5116 (provided over the bottom surface of a first dielectric material of the dielectric material regions 5112 and (ii) the dielectric layer 5116 provided over the top surface of a second dielectric material of the dielectric material regions 5112. The dielectric material regions 5112 lie below the first dielectric material.

In the regions between consecutive doping regions such as in the region between the first and second doping regions 5311 and 5312, a plurality of conductive material regions 5211 to 5291 may be provided over the exposed surface of the dielectric layer 5116. The plurality of the conductive material regions extend in the first direction and are spaced apart at regular intervals in the second direction in an interleaving configuration with the plurality of the dielectric material regions 5112. The dielectric layers 5116 fill the space between the conductive material regions and the dielectric material regions 5112. So for example, the conductive material region 5211 which extends in the first direction may be provided between the dielectric material region 5112 adjacent to the substrate 5111 and the substrate 5111. In particular, the conductive material region 5211 which extends in the first direction may be provided between (i) the dielectric layer 5116 disposed over the substrate 5111 and (ii) the dielectric layer 5116 disposed over the bottom surface of the dielectric material region 5112 adjacent to the substrate 5111.

Each of the conductive material regions 5211 to 5291 which extends in the first direction may be provided between (i) a dielectric layer 5116 disposed over the top surface of one of the dielectric material regions 5112 and (ii) the dielectric layer 5116 disposed over the bottom surface of the next dielectric material region 5112. The conductive material regions 5221 to 5281 which extend in the first direction may be provided between the dielectric material regions 5112. The conductive material region 5291 which extends in the first direction may be provided over the uppermost dielectric material 5112. The conductive material regions 5211 to 5291 which extend in the first direction may be or include a metallic material. The conductive material regions 5211 to 5291 which extend in the first direction may be or include a conductive material such as polysilicon.

In the region between the second and third doping regions 5312 and 5313 the same structures as the structures between the first and second doping regions 5311 and 5312 may be provided. For example, in the region between the second and third doping regions 5312 and 5313, the plurality of dielectric material regions 5112 which extend in the first direction, the plurality of pillars 5113 which are sequentially arranged in the first direction and pass through the plurality of dielectric material regions 5112 in the second direction, the dielectric layer 5116 which is provided over the exposed surfaces of the plurality of dielectric material regions 5112 and the plurality of pillars 5113 and the plurality of conductive material regions 5212 to 5292 which extend in the first direction may be provided.

In the region between the third and fourth doping regions 5313 and 5314, the same structures as between the first and second doping regions 5311 and 5312 may be provided. For example, in the region between the third and fourth doping regions 5313 and 5314, the plurality of dielectric material regions 5112 which extend in the first direction, the plurality of pillars 5113 which are sequentially arranged in the first direction and pass through the plurality of dielectric material regions 5112 in the second direction, the dielectric layer 5116 which is provided over the exposed surfaces of the plurality of dielectric material regions 5112 and the plurality of pillars 5113, and the plurality of conductive material regions 5213 to 5293 which extend in the first direction may be provided.

Drains 5320 may be respectively provided over the plurality of pillars 5113. The drains 5320 may be silicon materials doped with second type impurities. The drains 5320 may be silicon materials doped with n-type impurities. While it is assumed for the sake of convenience that the drains 5320 include n-type silicon, it is to be noted that the drains 5320 are not limited to being n-type silicon. For example, the width of each drain 5320 may be larger than the width of each corresponding pillar 5113. Each drain 5320 may be provided in the shape of a pad over the top surface of each corresponding pillar 5113.

Conductive material regions 5331 to 5333 which extend in the third direction may be provided over the drains 5320. The conductive material regions 5331 to 5333 may be sequentially disposed in the first direction. The respective conductive material regions 5331 to 5333 may be electrically coupled with the drains 5320 of corresponding regions. The drains 5320 and the conductive material regions 5331 to 5333 which extend in the third direction may be electrically coupled with through contact plugs. The conductive material regions 5331 to 5333 which extend in the third direction may be a metallic material. The conductive material regions 5331 to 5333 which extend in the third direction may be a conductive material such as polysilicon.

In FIGS. 5 and 6, the respective pillars 5113 may form strings together with the dielectric layer 5116 and the conductive material regions 5211 to 5291, 5212 to 5292 and 5213 to 5293 which extend in the first direction. The respective pillars 5113 may form NAND strings NS together with the dielectric layer 5116 and the conductive material regions 5211 to 5291, 5212 to 5292 and 5213 to 5293 which extend in the first direction. Each NAND string NS may include a plurality of transistor structures TS.

Figure 7:
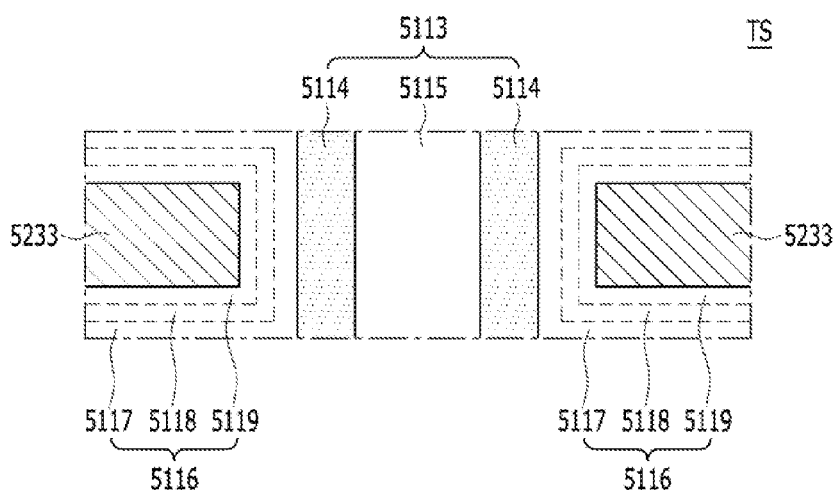

FIG. 7 is a cross-sectional view of the transistor structure TS shown in FIG. 6.

Referring to FIG. 7, in the transistor structure TS shown in FIG. 6, the dielectric layer 5116 may include first to third sub dielectric layers 5117, 5118 and 5119.

The surface layer 5114 of p-type silicon in each of the pillars 5113 may serve as a body. The first sub dielectric layer 5117 adjacent to the pillar 5113 may serve as a tunneling dielectric layer, and may include a thermal oxidation layer.

The second sub dielectric layer 5118 may serve as a charge storing layer. The second sub dielectric layer 5118 may serve as a charge capturing layer, and may include a nitride layer or a metal oxide layer such as an aluminum oxide layer, a hafnium oxide layer, or the like.

The third sub dielectric layer 5119 adjacent to the conductive material 5233 may serve as a blocking dielectric layer. The third sub dielectric layer 5119 adjacent to the conductive material 5233 which extends in the first direction may be formed as a single layer or multiple layers. The third sub dielectric layer 5119 may be a high-k dielectric layer such as an aluminum oxide layer, a hafnium oxide layer, or the like, which has a dielectric constant greater than the first and second sub dielectric layers 5117 and 5118.

The conductive material 5233 may serve as a gate or a control gate. That is, the gate or the control gate 5233 the blocking dielectric layer 5119, the charge stating layer 5118, the tunneling dielectric layer 5117 and the body 5114 may form a transistor or a memory cell transistor structure. For example the first to third sub dielectric layers 5117 to 5119 may form an oxide-nitride-oxide (ONO) structure. In the embodiment, for the sake of convenience, the surface layer 5114 of p-type silicon in each of the pillars 5113 will be referred to as a body in the second direction.

The memory block BLKi may include the plurality of pillars 5113. Namely, the memory block BLKi may include the plurality of NAND strings NS. In detail, the memory block BLKi may include the plurality of NAND strings NS which extend in the second direction or a direction perpendicular to the substrate 5111.

Each NAND string NS may include the plurality of transistor structures TS which are disposed in the second direction. At least one of the plurality of transistor structures TS of each NAND string NS may serve as a string source transistor SST. At least one of the plurality of transistor structures TS of each NAND string NS may serve as a ground select transistor GST.

The gates or control gates may correspond to the conductive material regions 5211 to 5291, 5212 to 5292 and 5213 to 5293 which extend in the first direction. In other words, the gates or the control gates may extend in the first direction and form word lines and at least two select lines at least one source select line SSL and at least one ground select line GSL.

The conductive material regions 5331 to 5333 which extend in the third direction may be electrically coupled to one end of the NAND strings NS. The conductive material regions 5331 to 5333 which extend in the third direction may serve as bit lines BL. That is, in one memory block BLKi, the plurality of NAND strings NS may be electrically coupled to one bit line BL.

The second type doping regions 5311 to 5314 which extend in the first direction may be provided to the other ends of the NAND strings NS. The second type doping regions 5311 to 5314 which extend in the first direction may serve as common source lines CSL.

Namely, the memory block BLKi may include a plurality of NAND strings NS which extend in a direction perpendicular to the substrate 5111, e.g., the second direction, and may serve as a NAND flash memory block, for example, of a charge capturing type memory, in which a plurality of NAND strings NS are electrically coupled to one bit line BL.

While it is illustrated in FIGS. 5 to 7 that the conductive material regions 5211 to 5291, 5212 to 5292 and 5213 to 5293 which extend in the first direction are provided in 9 layers, it is to be noted that the conductive material regions 5211 to 5291, 5212 to 5292 and 5213 to 5293 which extend in the first direction are not limited to being provided in 9 layers. For example, conductive material regions which extend in the first direction may be provided in 8 layers, 16 layers or any multiple of layers. In other words in one NAND string NS, the number of transistors may be 8, 16 or more.

While it is illustrated in FIGS. 5 to 7 that 3 NAND strings NS are electrically coupled to one bit line BL, it is to be noted that the embodiment is not limited to having 3 NAND strings NS that are electrically coupled to one bit line BL. In the memory block BLKi, m number of NAND strings NS may be electrically coupled to one bit line BL, m being a positive integer. According to the number of NAND strings NS which are electrically coupled to one bit line BL, the number of conductive material regions 5211 to 5291, 5212 to 5292 and 5213 to 5293 which extend in the first direction and the number of common source lines 5311 to 5314 may be controlled as well.

Further, while it is illustrated in FIGS. 5 to 7 that 3 NAND strings NS are electrically coupled to one conductive material which extends in the first direction, it is to be noted that the embodiment is not limited to having 3 NAND strings NS electrically coupled to one conductive material which extends in the first direction. For example, n number of NAND strings NS may be electrically coupled to one conductive material which extends in the first direction, n being a positive integer. According to the number of NAND strings NS which are electrically coupled to one conductive material which extends in the first direction, the number of bit lines 5331 to 5333 may be controlled as well.

FIG. 8 is an equivalent circuit diagram illustrating the memory block BLKi having a first structure as described with reference to FIGS. 5 to 7.

Referring to FIG. 8, block BLKi may have a plurality of NAND strings NS11 to NS31 between a first bit line BL1 and a common source line CSL. The first bit line BL1 may correspond to the conductive material region 5331 of FIGS. 5 and 6, which extends in the third direction. NAND strings NS12 to NS32 may be provided between a second bit line BL2 and the common source line CSL. The second bit line BL2 may correspond to the conductive material region 5332 of FIGS. 5 and 6, which extends in the third direction. NAND strings NS13 to NS33 may be provided between a third bit line BL3 and the common source line CSL. The third bit line BL3 may correspond to the conductive material region 5333 of FIGS. 5 and 6, which extends in the third direction.

A source select transistor SST of each NAND string NS may be electrically coupled to a corresponding bit line BL. A ground select transistor GST of each NAND string NS may be electrically coupled to the common source line CSL. Memory cells MC may be provided between the source select transistor SST and the ground select transistor GST of each NAND string NS.

In this example, NAND strings NS may be defined by units of rows and columns and NAND strings NS which are electrically coupled to one bit line may form one column. The NAND strings NS11 to NS31 which are electrically coupled to the first bit line BL1 may correspond to a first column, the NAND strings NS12 to NS32 which are electrically coupled to the second bit line BL2 may correspond to a second column and the NAND strings NS13 to NS33 which are electrically coupled to the third bit line BL3 may correspond to a third column. NAND strings NS which are electrically coupled to one source select line SSL may form one row. The NAND strings NS11 to NS13 which are electrically coupled to a first source select line SSL1 may form a first row, the NAND strings NS21 to NS23 which are electrically coupled to a second source select line SSL2 may form a second row, and the NAND strings NS31 to NS33 which are electrically coupled to a third source select line SSL3 may form a third row.

In each NAND string NS, a height may be defined. In each NAND string NS, the height of a memory cell MC1 adjacent to the ground select transistor GST may have a value '1'. In each NAND string NS, the height of a memory cell may increase as the memory cell gets closer to the source select transistor SST when measured from the substrate 5111. For example, in each NAND string NS, the height of a memory cell MC6 adjacent to the source select transistor SST may be 7.

The source select transistors SST of the NAND strings NS in the same row may share the source select line SSL. The source select transistors SST of the NAND strings NS in different rows may be respectively electrically coupled to the different source select lines SSL1, SSL2 and SSL3.

The memory cells at the same height in the NAND strings NS in the same row may share a word line WL. That is at the same height, the word lines WL electrically coupled to the memory cells MC of the NAND strings NS in different rows may be electrically coupled. Dummy memory cells DMC at the same height in the NAND strings NS of the same row may share a dummy word line DWL. Namely, at the same height or level, the dummy word lines DWL electrically coupled to the dummy memory cells DMC of the NAND strings NS in different rows may be electrically coupled.

The word lines WL or the dummy word lines DWL located at the same level or height or layer may be electrically coupled with one another at layers where the conductive material regions 5211 to 5291, 5212 to 5292 and 5213 to 5293 which extend in the first direction may be provided. The conductive material regions 5211 to 5291, 5212 to 5292 and 5213 to 5293 which extend in the first direction may be electrically coupled in common to upper layers through contacts. At the upper layers, the conductive material regions 5211 to 5291 5212 to 5292 and 5213 to 5293 which extend in the first direction may be electrically coupled. In other words, the ground select transistors GST of the NAND strings NS in the same row may share the ground select line GSL. Further, the ground select transistors GST of the NAND strings NS in different rows may share the ground select line GSL. That is, the NAND strings NS11 to NS13, NS21 to NS23 and NS31 to NS33 may be electrically coupled to the ground select line GSL.

The common source line CSL may be electrically coupled to the NAND strings NS. Over the active regions and over the substrate 5111, the first to fourth doping regions 5311 to 5314 may be electrically coupled. The first to fourth doping regions 5311 to 5314 may be electrically coupled to an upper layer through contacts and, at the upper layer, the first to fourth doping regions 5311 to 5314 may be electrically coupled.

For example, as shown in FIG. 8, the word lines WL of the same height or level may be electrically coupled. Accordingly, when a word line WL at a specific height is selected, all NAND strings NS which are electrically coupled to the word line WL may be selected. The NAND strings NS in different rows may be electrically coupled to different source select lines SSL. Accordingly, among the NAND strings NS electrically coupled to the same word line WL, by selecting one of the source select lines SSL1 to SSL3, the NAND strings NS in the unselected rows may be electrically isolated from the bit lines BL1 to BL3. In other words, by selecting one of the source select lines SSL1 to SSL3, a row of NAND strings NS may be selected. Moreover, by selecting one of the bit lines BL1 to BL3, the NAND strings NS in the selected rows may be selected in units of columns.

In each NAND string NS, a dummy memory cell DMC may be provided. In FIG. 8, the dummy memory cell DMC may be provided between a third memory cell MC3 and a fourth memory cell MC4 in each NAND String NS. That is first to third memory cells MC1 to MC3 may be provided between the dummy memory cell DMC and the ground select transistor GST. Fourth to sixth memory cells MC4 to MC6 may be provided between the dummy memory cell DMC and the source select transistor SST. The memory cells MC of each NAND string NS may be divided into memory cell groups by the dummy memory cell DMC. In the divided memory cell groups, memory cells, for example, MC1 to MC3, adjacent to the ground select transistor GST may be referred to as a lower memory cell group, and memory cells, for example MC4 to MC6, adjacent to the string select transistor SST may be referred to as an upper memory cell group.

Hereinbelow, detailed descriptions will be made with reference to FIGS. 9 to 11, which show a memory device in a memory system, according to another embodiment of the invention.

Figure 9:
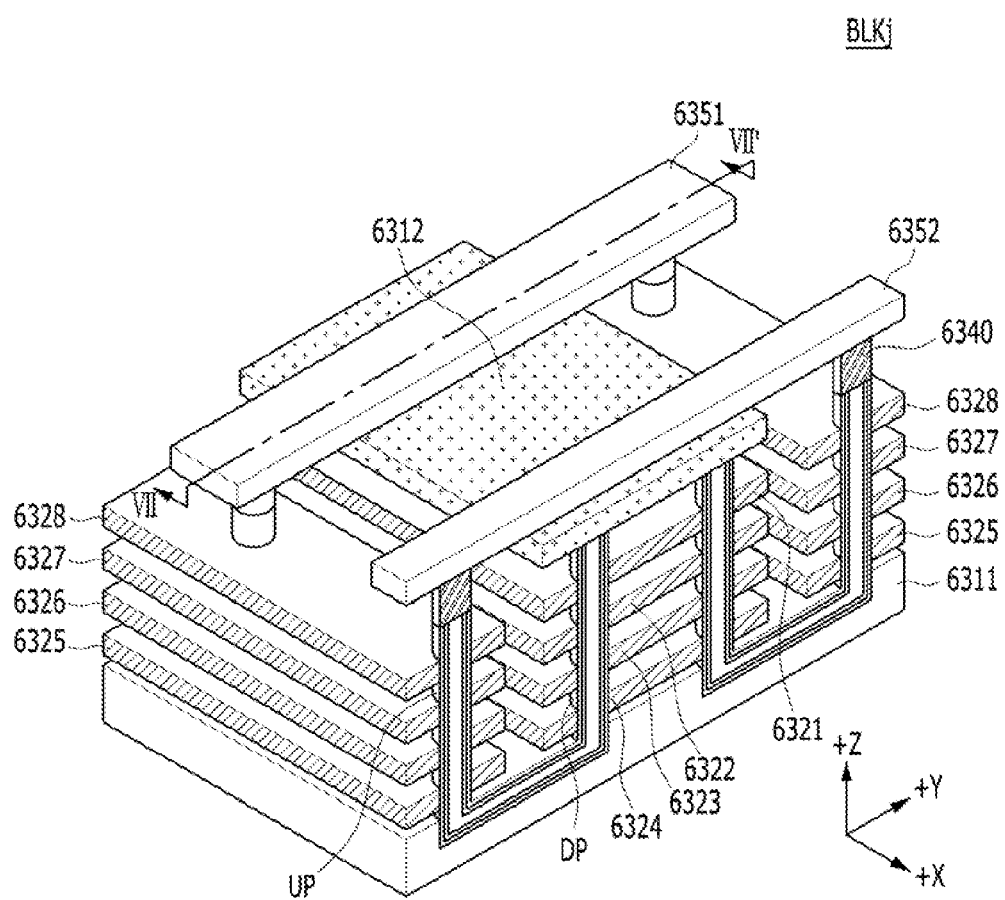

In particular, FIG. 9 is a perspective view schematically illustrating a memory device implemented with a three-dimensional (3D) nonvolatile memory device, which is different from the first structure described above with reference to FIGS. 5 to 8. FIG. 10 is a cross-sectional view illustrating the memory block BLKj taken along the line VII-VII' of FIG. 9.

Figure 10:
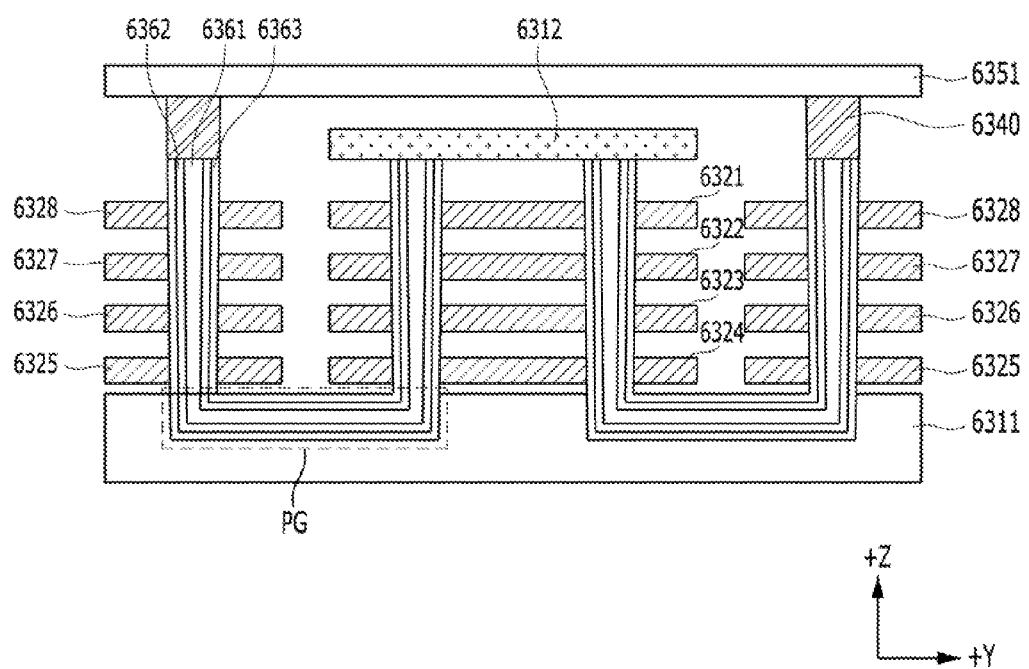

Referring to FIGS 9 and 10 the memory block BLKj may include structures which extend in the first to third directions and may include a substrate 6311. The substrate 6311 may include a silicon material doped with a first type impurity. For example, the substrate 6311 may include a silicon material doped with a p-type impurity or may be a p-type well, for example, a pocket p-well, and include an n-type well which surrounds the p-type well. While it is assumed in the embodiment shown, that the substrate 6311 is p-type silicon, it is to be noted that the substrate 6311 is not limited to being p-type silicon.

First to fourth conductive material regions 6321 to 6324 which extend in the x-axis direction and the y-axis direction are provided over the substrate 6311. The first to fourth conductive material regions 6321 to 6324 may be separated by a predetermined distance in the z-axis direction.

Fifth to eighth conductive material regions 6325 to 6328 which extend in the x-axis direction and the y-axis direction may be provided over the substrate 6311. The fifth to eighth conductive material regions 6325 to 6328 may be separated by the predetermined distance in the z-axis direction. The fifth to eighth conductive material regions 6325 to 6328 may be separated from the first to fourth conductive material regions 6321 to 6324 in the y-axis direction.

A plurality of lower pillars DP which pass through the first to fourth conductive material regions 6321 to 6324 may be provided. Each lower pillar DP extends in the z-axis direction. Also, a plurality of upper pillars UP which pass through the fifth to eighth conductive material regions 6325 to 6328 may be provided. Each upper pillar UP extends in the z-axis direction.

Each of the lower pillars DP and the upper pillars UP may include an internal material 6361, an intermediate layer 6362, and a surface layer 6363. The intermediate layer 6362 may serve as a channel of the cell transistor. The surface layer 6363 may include a blocking dielectric layer, a charge storing layer and a tunneling dielectric layer.

The lower pillar DP and the upper pillar UP may be electrically coupled through a pipe gate PG. The pipe gate PG may be disposed in the substrate 6311. For instance, the pipe gate PG may include the same material as the tower pillar DP and the upper pillar UP.

A doping material 6312 of a second type which extends in the x-axis direction and the y-axis direction may be provided over the lower pillars DP. For example, the doping material 6312 of the second type may include an n-type silicon material. The doping material 6312 of the second type may serve as a common source line CSL.

Drains 6340 may be provided over the upper pillars UP. The drains 6340 may include an n-type silicon material. First and second upper conductive material regions 6351 and 6352 which extend in the y-axis direction may be provided over the drains 6340.

The first and second upper conductive material regions 6351 and 6352 may be separated in the x-axis direction. The first and second upper conductive material regions 6351 and 6352 may be formed of a metal. The first and second upper conductive material regions 6351 and 6352 and the drains 6340 may be electrically coupled through contact plugs. The first and second upper conductive material regions 6351 and 6352 respectively serve as first and second bit lines BL1 and BL2.

The first conductive material 6321 may serve as a source select line SSL, the second conductive material 6322 may serve as a first dummy word line DWL1, and the third and fourth conductive material regions 6323 and 6324 serve as first and second main word lines MWL1 and MWL2, respectively. The fifth and sixth conductive material regions 6325 and 6326 serve as third and fourth main word lines MWL3 and MWL4, respectively, the seventh conductive material 6327 may serve as a second dummy word line DWL2, and the eighth conductive material 6328 may serve as a drain select line DSL.

The lower pillar DP and the first to fourth conductive material regions 6321 to 6324 adjacent to the lower pillar DP form a lower string. The upper pillar UP and the fifth to eighth conductive material regions 6325 to 6328 adjacent to the upper pillar UP form an upper string. The lower string and the upper string may be electrically coupled through the pipe gate PG. One end of the lower string may be electrically coupled to the doping material 6312 of the second type which serves as the common source line CSL. One end of the upper string may be electrically coupled to a corresponding bit line through the drain 6340. One lower string and one upper string form one cell string which is electrically coupled between the doping material 6312 of the second type serving as the common source line CSL and a corresponding one of the upper conductive material layers 6351 and 6352 serving as the bit line BL.

That is the lower string may include a source select transistor SST, the first dummy memory cell DMC1, and the first and second main memory cells MMC1 and MMC2. The upper string may include the third and fourth main memory cells MMC3 and MMC4, the second dummy memory cell DMC2, and a drain select transistor DST.

In FIGS. 9 and 10 the upper string and the lower string may form a NAND string NS, and the NAND string NS may include a plurality of transistor structures TS. Since the transistor structure included in the NAND string NS in FIGS. 9 and 10 is described above in detail with reference to FIG. 7, a detailed description thereof will be omitted herein.

Figure 11:
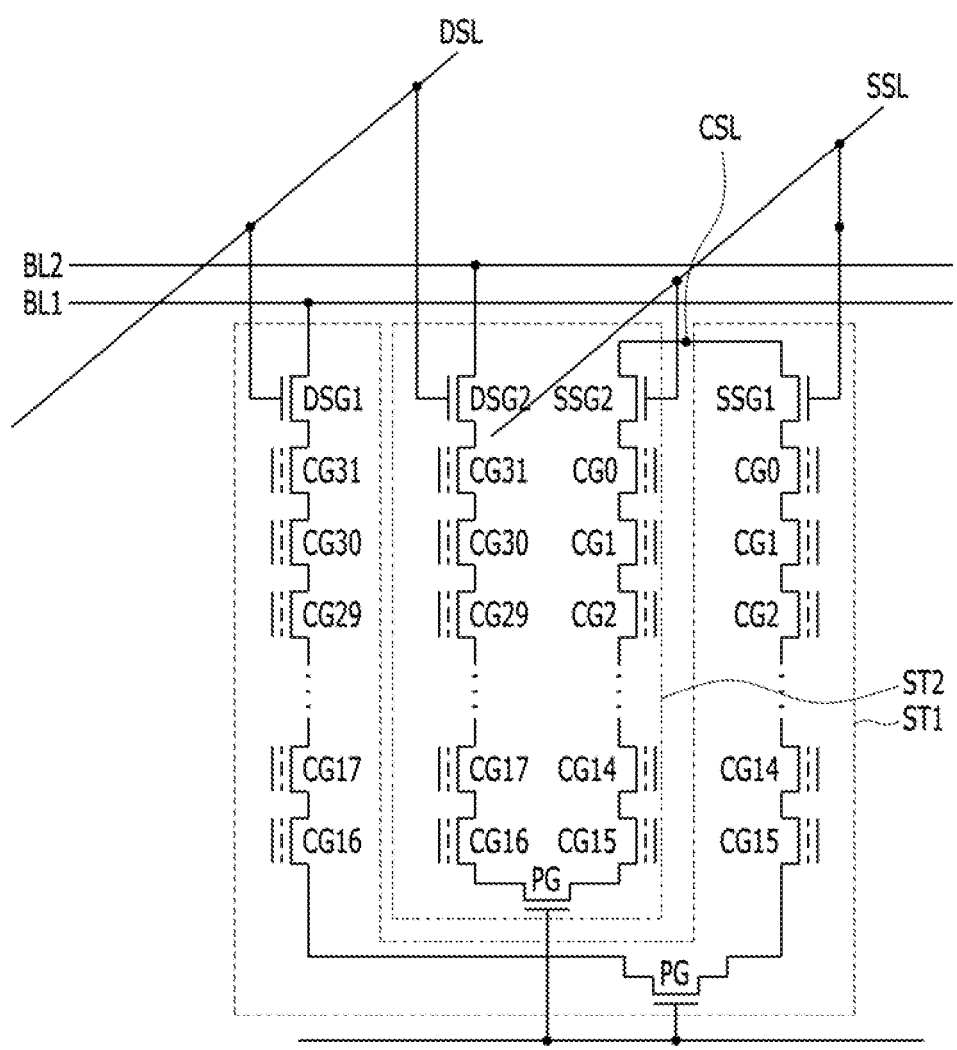

FIG. 11 is a circuit diagram illustrating the equivalent circuit of the memory block BLKj having the second structure as described above with reference to FIGS. 9 and 10. For the sake of convenience, only a first string and a second string, which form a pair in the memory block BLKj in the second structure are shown.

Referring to FIG. 11, in the memory block BLKj having the second structure, cell strings each of which is implemented with one upper string and one lower string electrically coupled through the pipe gate PG as described above with reference to FIGS. 9 and 10, may be provided, in such a way as to define a plurality of pairs.

For example, in the certain memory block BLKj having the second structure, memory cells CG0 to CG31 stacked along a first channel CH1 (not shown), for example, at least one source select gate SSG1 and at least one drain select gate DSG1 may form a first string ST1, and memory cells CG0 to CG31 stacked along a second channel CH2 (not shown), for example, at least one source select gate SSG2 and at least one drain select gate DSG2 may form a second string ST2.

The first string ST1 and the second string ST2 may be electrically coupled to the same drain select line DSL and the same source select line SSL. The first string ST1 may be electrically coupled to a first bit line BL1, and the second string ST2 may be electrically coupled to a second bit line BL2.

While it is described in FIG. 11 that the first string ST1 and the second string ST2 are electrically coupled to the same drain select line DSL and the same source select line SSL, it may be envisaged that the first string ST1 and the second string ST2 may be electrically coupled to the same source select line SSL and the same bit line BL, the first string ST1 may be electrically coupled to a first drain select line DSL1 and the second string ST2 may be electrically coupled to a second drain select line DSL2. Further it may be envisaged that the first string ST1 and the second string ST2 may be electrically coupled to the same drain select line DSL and the same bit line BL, the first string ST1 may be electrically coupled to a first source select line SSL1 and the second string ST2 may be electrically coupled a second source select line SSL2.

Figure 12B:
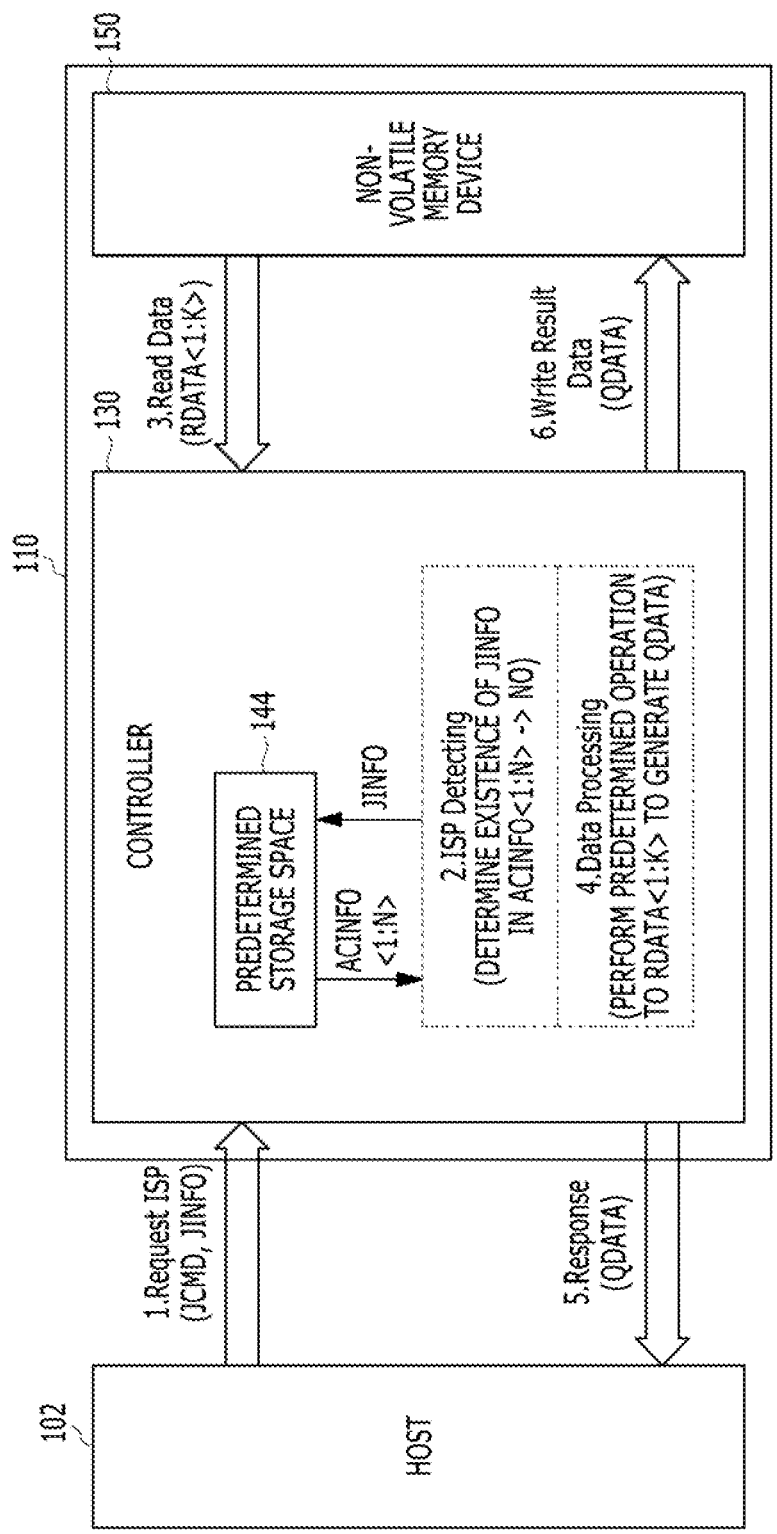
Figure 12C:
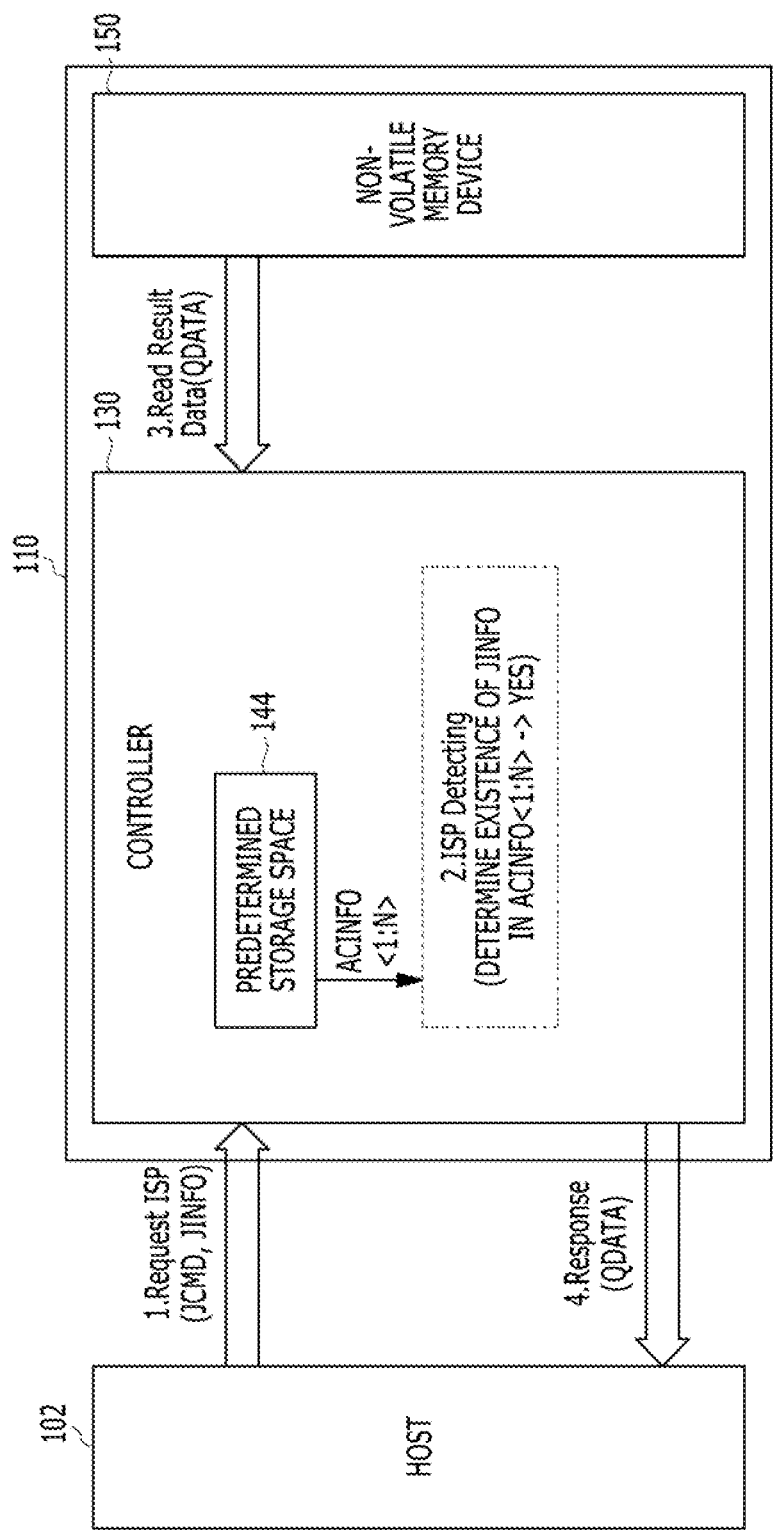

FIGS. 12A to 12C are block diagrams illustrating an in-storage processing (ISP) operation of the memory system 110 according to an embodiment of the present invention.

As described with reference to FIG. 1, the memory system 110 may include the non-volatile memory device 150 and the controller 130.

The ISP is a series of processes performed in the memory system 110 supporting the ISP operation.

The memory system 110 may store input data and read out stored data in response to a request from the host 102 while the host may perform a preset operation to the data read from the memory system. The memory system 110 may support an ISP operation. For example, the memory system 110 may read out two or more data in response to a single request from the host 102 and may perform a preset operation to the two or more of the read-out data to generate a single resulting data. The memory system may then output the single resulting data to the host 102.

For example, a preset operation may include joining the read-out two or more data together, and/or comparing the read-out two or more data with one another or any other suitable operation.

The memory system performing one or more preset operations on its own may be advantageous because it may reduce the operational burden of the host 102.

Further, data traffic may be reduced. Instead of the memory system 110 providing the read two or more data to the host 102 for the host to perform a preset operation, the memory system 110 through an ISP operation may output only the resulting data to the host 102. Hence, data traffic between the memory system 110 and the host 102 may be reduced.

FIG. 12A shows an example of an ISP operation between the host 102 and the memory system 110. Accordingly, the host 102 may provide a command JCMD requesting an ISP operation to the memory system 110 ("1. Request ISP" in FIG. 12A).

The memory system 110 may read out data RDATA<1:K> from the non-volatile memory device 150 according to a process information JINFO for the requested ISP operation provided from the host 102 as well as the command JCMD ("2. Read Data" in FIG. 12A).

The controller 130 of the memory system 110 may generate a resulting data QDATA by performing a preset operation to the data RDATA<1:K> according to the process information JINFO ("3. Data Processing" in FIG. 12A).

The requested ISP operation may end when the memory system 110 outputs the resulting data QDATA to the host 102 ("4. Response" in FIG. 12A).

The process information JINFO for the requested ISP operation may include process address information representing each location of the data RDATA<1:K> in the non-volatile memory device 150, and requested operation information representing the type of the preset operation corresponding to the requested ISP operation.

FIGS. 12B and 12C illustrate an additional process feature added to the ISP operation described with reference to FIG. 12A. Accordingly, an additional process feature may be determining whether a currently requested ISP operation was requested in the past by checking the process information JINFO for the currently requested ISP operation ("2. ISP Detecting" in FIG. 12B). The additional process feature may be performed by the controller 130, when the host 102 requests the ISP operation by providing the command JCMD.("1. Request ISP" in FIG. 12B).

As shown in FIG. 12B, the memory system 110 may perform a first ISP operation upon a determination that the currently requested ISP operation has not been requested in the past.

The first ISP operation may include reading-out of the data RDATA<1:K> from the non-volatile memory device 150 in response to the process information JINFO for the currently requested ISP operation ("3. Read Data" in FIG. 12B), generating of the resulting data QDATA by performing the preset operation to the data RDATA<1:K> in response to the process information JINFO for the currently requested ISP operation ("4. Data Processing" in FIG. 12B), outputting of the resulting data QDATA to the host 102 ("5. Response" in FIG. 12B), and storing of the resulting data QDATA into the non-volatile memory device 150 ("6. Write Result Data" in FIG. 12B).

During the first ISP operation, the additional process feature may be the storing of the resulting data QDATA into the non-volatile memory device 150. A second ISP operation may be performed on the basis of the resulting data QDATA, which is stored in the non-volatile memory device 150 during the first ISP operation.

As shown in FIG. 12C, the memory system 110 may perform the second ISP operation when it is determined that the currently requested ISP operation is also requested in the past.

The second ISP operation may include reading-out of the resulting data QDATA corresponding to the currently requested ISP operation from the non-volatile memory device 150 ("3. Read Result Data" in FIG. 12C), and outputting the resulting data QDATA to the host 102 ("4. Response" in FIG. 12C).

Since the resulting data QDATA is stored in the non-volatile memory device 150 during the first ISP operation as described above, the resulting data QDATA may be read-out from the non-volatile memory device 150 during the second ISP operation. When it is determined that the currently requested ISP operation is also requested in the past ("2. ISP Detecting" in FIG. 12C), the currently requested ISP operation was requested in the past and therefore the currently requested ISP operation was identified as the first ISP operation at that time and the resulting data QDATA corresponding to the currently requested ISP operation has been already stored in the non-volatile memory device 150 as the resulting data at that time. Therefore, when performing the second ISP operation according to the currently requested ISP operation, it is possible to read out the resulting data QDATA from the non-volatile memory device 150 through the process information JINFO for the currently requested ISP operation.

Determination of whether the currently requested ISP operation is also requested in the past by checking the process information JINFO for the currently requested ISP operation ("2. ISP Detecting" in FIGS. 12B and 12C) will be described below in more detail.

The controller 130 may accumulate the process information JINFO as a cumulative operation information ACINFO<1:N> in the memory 144 thereof during each first ISP operation. Therefore, when host 102 requests the ISP operation by providing the command JCMD to the memory system 110 ("1. Request ISP" in FIGS. 12B and 12C), the controller 130 may determine whether the currently requested ISP operation is also requested in the past by comparing the process information JINFO for the currently requested ISP operation with the cumulative operation information ACINFO<1:N> ("2. ISP Detecting" in FIGS. 12B and 12C).

The process information JINFO for the requested ISP operation may include the process address information representing each location of the data RDATA<1:K> in the non-volatile memory device 150, and the requested operation information representing a type of the preset operation corresponding to the requested ISP operation.

The cumulative operation information ACINFO<1:N> may cumulatively include the process information JINFO for the first ISP operation performed in the past. Further, the cumulative operation information ACINFO<1:N> may cumulatively include resulting address information representing each location of the resulting data QDATA in the non-volatile memory device 150 corresponding to the first ISP operation performed in the past.

During comparison between the process information JINFO for the currently requested ISP operation with the cumulative operation information ACINFO<1:N>, the controller 130 may perform a first comparison operation to the process address information of the process information JINFO for the currently requested ISP operation and the cumulative operation information ACINFO<1:N>.

When the process address information of the process information JINFO for the currently requested ISP operation and the cumulative operation information ACINFO<1:N> are the same as each other as a result of the first comparison operation, the controller 130 may perform a second comparison operation to the requested operation information of the process information JINFO for the currently requested ISP operation and the cumulative operation information ACINFO<1:N> corresponding to the process address information of the process information JINFO for the currently requested ISP operation determined the same during the first comparison operation.

When the process address information of the process information JINFO for the currently requested ISP operation and the cumulative operation information ACINFO<1:N> are not the same as each other as a result of the first comparison operation, the second comparison operation may not be performed and it may be determined that the currently requested ISP operation is not requested in the past.

As a result of the second comparison operation, when the requested operation information of the process information JINFO for the currently requested ISP operation is the same as the requested operation information of the cumulative operation information ACINFO<1:N> corresponding to the process address information of the process information JINFO for the currently requested ISP operation determined the same during the first comparison operation, it may be determined that the currently requested ISP operation is also requested in the past.

During the first comparison operation to the process address information of the process information JINFO for the currently requested ISP operation and the cumulative operation information ACINFO<1:N>, there may be a case where a number of data corresponding to the process address information of the cumulative operation information ACINFO<1:N> is not the same as a number of data corresponding to the process address information of the process information JINFO for the currently requested ISP operation. In this case, it should be determined that the requested operation information of the process information JINFO for the currently requested ISP operation is not the same as the requested operation information of the cumulative operation information ACINFO<1:N> corresponding to the process address information of the process information JINFO for the currently requested ISP operation determined the same during the first comparison operation.

For example, when a number of the data corresponding to the process address information of the cumulative operation information ACINFO<1:N> is 3 while a number of the data corresponding to the process address information of the process information JINFO for the currently requested ISP operation is 2, there may be a case where first 2 of the 3 data corresponding to the process address information of the cumulative operation information ACINFO<1:N> is the same as the 2 data corresponding to the process address information of the process information JINFO for the currently requested ISP operation. In such case, the substantially different process address information may be erroneously determined the same as each other. Therefore, when a number of data corresponding to the process address information of the process information JINFO for the currently requested ISP operation is not the same as a number of data corresponding to the process address information of the cumulative operation information ACINFO<1:N> corresponding to the process address information of the process information JINFO for the currently requested ISP operation determined the same during the first comparison operation, it should be determined that the requested operation information of the process information JINFO for the currently requested ISP operation and the cumulative operation information ACINFO<1:N> are not the same as each other during the second comparison operation.

The cumulative operation information ACINFO<1:N> may be maintained in the memory 144 only during power supply to the memory system 110. Accordingly, an additional operation of the controller 130 may be required in order to keep the cumulative operation information ACINFO<1:N> regardless of the power supply to the memory system 110.

For example, the controller 130 may back up the cumulative operation information ACINFO<1:N> stored in the memory 144 to the non-volatile memory device 150 at power-off of the memory system 110. At restoration of the power supply to the memory system 110, the controller 130 may retrieve the cumulative operation information ACINFO<1:N> from the non-volatile memory device 150, and store the cumulative operation information ACINFO<1:N> back to the memory 144 for the comparison operation with the process information JINFO for the currently requested ISP operation.

A number of the cumulative operation information ACINFO<1:N> to be stored in the memory 144 may be limited to a preset numbers. When too many cumulative operation information ACINFO<1:N> are to be stored in the memory 144, the cumulative operation information ACINFO<1:N> may occupy too much storage space within the memory 144 and the controller 130 may have too much burden to compare the process information JINFO for the currently requested ISP operation with the cumulative operation information ACINFO<1:N> ("2. ISP Detecting" in FIGS. 12B and 12C).

Therefore, a number of the cumulative operation information ACINFO<1:N> to be stored in the memory 144 may be limited to a maximum number of times wherein N is an integer greater than 2. When the memory 144 is full and an additional process information JINFO is to be newly stored in the memory 144, the oldest hit one among the cumulative operation information ACINFO<1:N> may be deleted from the memory 144 and the additional process information JINFO may be newly stored as the cumulative operation information ACINFO<1:N> in the memory 144. One of the cumulative operation information ACINFO<1:N> may be hit by the process information JINFO for the currently requested ISP operation when the controller 130 determines that the currently requested ISP operation is requested in the past or when the process information JINFO for the currently requested ISP operation is already included in the cumulative operation information ACINFO<1:N>.

For example, a number of the cumulative operation information ACINFO<1:N> to be stored in the memory 144 may be limited to N (N is an integer greater than 2). When the memory 144 is full and an additional process information JINFO is to be newly stored in the memory 144, one of the furthest scarce request among the cumulative operation information ACINFO<1:N> stored in the memory 144 may be deleted from the memory 144 and the additional process information JINFO may be newly stored as the cumulative operation information ACINFO<1:N> in the memory 144.

As described above, during the ISP operation including the process features, the controller 130 may generate the resulting data QDATA and store the resulting data QDATA in the non-volatile memory device 150. The controller 130 may partition the non-volatile memory device 150 for the storage of the resulting data QDATA.

Further, in order to keep the cumulative operation information ACINFO<1:N> regardless of the power supply to the memory system 110 as described above, the controller 130 may detect the power-off of the memory system 110 and may back up the cumulative operation information ACINFO<1:N> stored in the memory 144 to the non-volatile memory device 150. The controller 130 may partition the non-volatile memory device 150 for the backup of the cumulative operation information ACINFO<1:N>.

For example, when the data RDATA<1:K> for the currently requested ISP operation are stored in a first region of the non-volatile memory device 150, the controller 130 may store the resulting data QDATA generated as a result of the currently requested ISP operation in a second region of the non-volatile memory device 150, thereby preventing mixed-up of the data RDATA<1:K> and the resulting data QDATA in the non-volatile memory device 150. Further, the controller 130 may back up the cumulative operation information ACINFO<1:N> in a third region of the non-volatile memory device 150 thereby preventing mixed-up of the data RDATA<1:K> the resulting data QDATA and the backed-up cumulative operation information ACINFO<1:N> in the non-volatile memory device 150.

Figure 13:
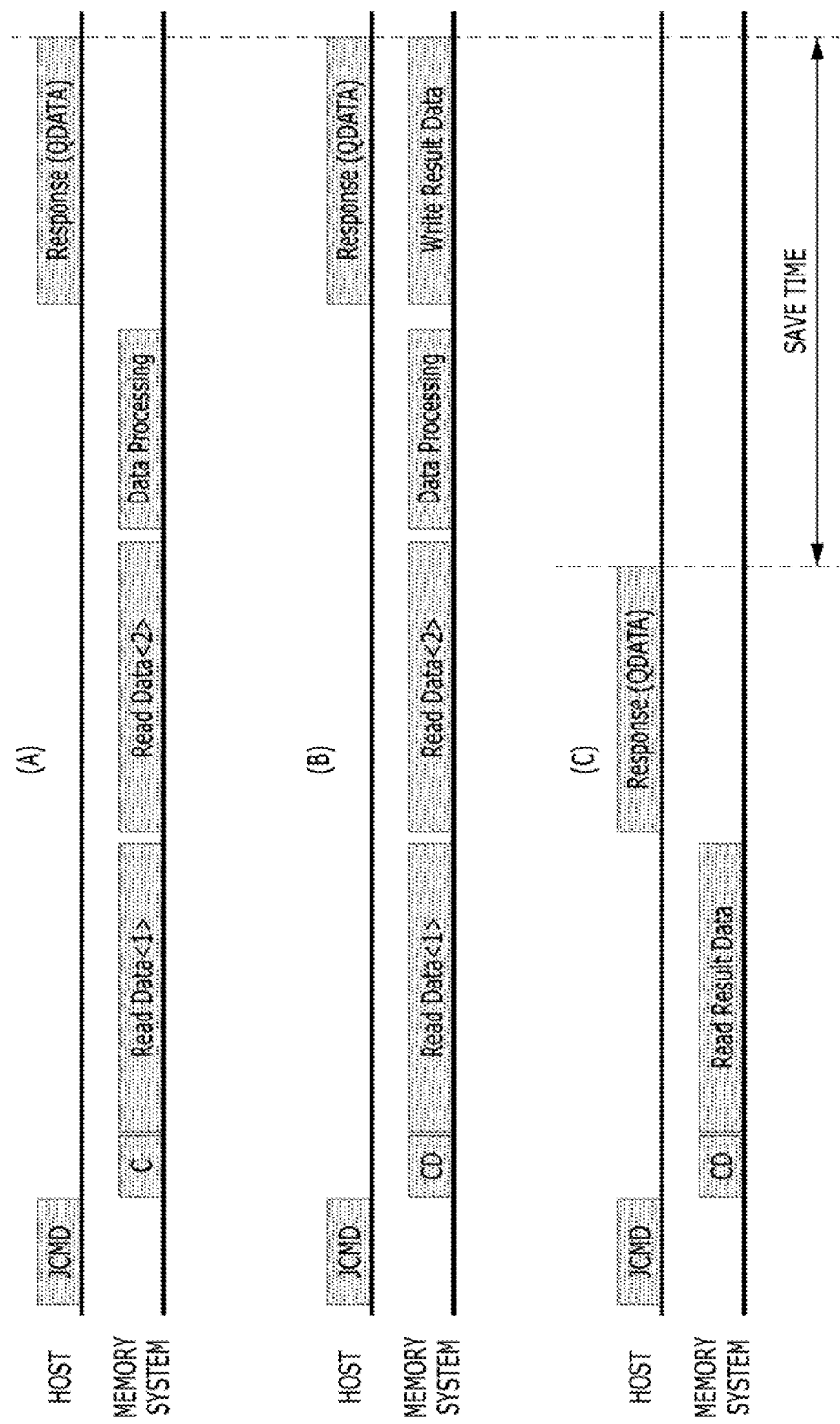
FIG. 13 is a timing diagram illustrating an in-storage processing (ISP) operation of a memory system shown in FIGS. 12A to 12C.

FIG. 13 is a timing diagram illustrating the ISP operation of the memory system 110 shown in FIGS. 12A to 12C.

Referring to FIG. 13, a timing diagram 'A' corresponds to the ISP operation described with reference to FIG. 12A, a timing diagram 'B' corresponds to the first ISP operation described with reference to FIG. 12B, and a timing diagram 'C' corresponds to the second ISP operation described with reference to FIG. 12C.

Referring to the timing diagram 'A' of FIG. 13, the host 102 may provide the command JCMD requesting the ISP operation to the memory system 110. For example, the request of the ISP operation described with reference to FIG. 12A ("1. Request ISP" in FIG. 12A) may be performed.

Accordingly, the memory system 110 may check the command JCMD and the process information JINFO for the currently requested ISP operation ("C" in timing diagram 'A' of FIG. 13), and sequentially read out two data Read Data<1> and Read Data 2>. For example, the read-out of the data RDATA<1:K> described with reference to FIG. 12A ("2. Read Data" in FIG. 12A) may be performed. For reference, FIG. 13 exemplarily shows sequential read-out of the two data Read Data<1> and Read Data<2>, which is just an example, but the data RDATA<1:K> may be concurrently read out in parallel.

And then, the memory system 110 may perform the preset operation to the two data Read Data<1> and Read Data<2>. For example, the preset operation described with reference to FIG. 12A ("3. Data Processing" in FIG. 12A) may be performed.

Then, the memory system 110 may output the resulting data QDATA, which is generated as the result of the preset operation, to the host 102. For example, the output of the resulting data QDATA described with reference to FIG. 12A ("4. Response" in FIG. 12A) may be performed.

Referring to the timing diagram 'B' of FIG. 13, the host 102 may provide the command JCMD requesting the ISP operation to the memory system 110. For example, the request of the ISP operation described with reference to FIG. 12B ("1. Request ISP" in FIG. 12B) may be performed.

Accordingly, the memory system 110 may check the command JCMD requesting the ISP operation and the process information JINFO for the currently requested ISP operation ("C" in timing diagram 'B' of FIG. 13), and may determine whether the currently requested ISP operation is also requested in the past by comparing the process information JINFO for the currently requested ISP operation with the cumulative operation information ACINFO<1:N> ("D" in timing diagram 'B' of FIG. 13). For example, determination of whether the currently requested ISP operation is also requested in the past described with reference to FIG. 12B ("2. ISP Detecting" in FIG. 12B) may be performed.

When it is determined that the currently requested ISP operation is not requested in the past or that the process information JINFO for the currently requested ISP operation is not the same as the cumulative operation information ACINFO<1:N> as exemplified in the timing diagram 'B', the memory system 110 may sequentially read out two data Read Data<1> and Read Data<2> corresponding to the process information JINFO for the currently requested ISP operation. For example, the read-out of the data RDATA<1: K> described with reference to FIG. 12B ("3. Read Data" in FIG. 12B) may be performed. For reference, FIG. 13 exemplarily shows sequential read-out of the two data Read Data<1> and Read Data<2>, which is just an example, but the data RDATA<1:K> may be concurrently read out in parallel.

And then, the memory system 110 may perform the preset operation to the two data Read Data<1> and Read Data<2>. For example, the preset operation described with reference to FIG. 12B ("4. Data Processing" in FIG. 12B) may be performed.

Then, the memory system 110 may output the resulting data QDATA, which is generated as the result of the preset operation, to the host 102. For example, the output of the resulting data QDATA described with reference to FIG. 12B ("5. Response" in FIG. 12B) may be performed.

Further, during the time segment of the output of the resulting data QDATA ("5. Response"), the memory system 110 may store the resulting data QDATA in the non-volatile memory device 150. For example, the storing of the resulting data QDATA in the non-volatile memory device 150 described with reference to FIG. 12B ("6. Write Result Data" in FIG. 12B) may be performed.

As shown in the timing diagram 'B' of FIG. 13, the output of the resulting data QDATA ("5. Response") and the storing of the resulting data QDATA in the non-volatile memory device 150 ("6. Write Result Data") may be concurrently performed at completion of the preset operation ("4. Data Processing").

Therefore, as shown in the timing diagrams 'A' and 'B' of FIG. 13, the entire processes of both timing diagrams 'A' and 'B' may be completed at the same time, even though the process of the timing diagram 'B' may include storing of the resulting data QDATA in the non-volatile memory device 150 ("6. Write Result Data"). For example, the entire process of the two ISP operations described with reference to FIGS. 12A and 12B may be completed at the same time even though the entire process of the ISP operation described with reference to FIG. 12B includes an extra processing step, namely storing of the resulting data QDATA in the non-volatile memory device 150 ("6. Write Result Data").

Referring to the timing diagram 'C' of FIG. 13, the host 102 may provide the command JCMD requesting the ISP operation to the memory system 110. For example, the request of the ISP operation described with reference to FIG. 12C ("1. Request ISP" in FIG. 12C) may be performed.

Accordingly, the memory system 110 may check the command JCMD requesting the ISP operation and the process information JINFO for the currently requested ISP operation ("C" in timing diagram 'C' of FIG. 13), and may determine whether the currently requested ISP operation is also requested in the past by comparing the process information JINFO for the currently requested ISP operation with the cumulative operation information ACINFO<1:N> ("D" in timing diagram 'C' of FIG. 13). For example, determination of whether the currently requested ISP operation is also requested in the past may be performed, as described with reference to FIG. 12C ("2. ISP Detecting" in FIG. 12C).

When it is determined that the currently requested ISP operation is also requested in the past or that the process information JINFO for the currently requested ISP operation is the same as the cumulative operation information ACINFO<1:N> as exemplified in the timing diagram 'C', the memory system 110 may read out resulting data QDATA corresponding to the process information JINFO for the currently requested ISP operation. For example, the read-out of the resulting data QDATA may be performed, as described with reference to FIG. 12C ("3. Read Result Data" in FIG. 12C).

Then, the memory system 110 may output the resulting data QDATA retrieved from the non-volatile memory device 150, to the host 102 without performing the preset operation. For example, the output of the resulting data QDATA may be performed, as described with reference to FIG. 12C ("4. Response" in FIG. 12C).

When comparing the timing diagrams 'A' to 'C' of FIG. 13, the output of the resulting data QDATA ("4. Response" of the timing diagram 'C' in FIG. 13) in the timing diagram 'C' may be faster than the output of the resulting data QDATA in the timing diagrams 'A' and 'B' ("4. Response" and "5. Response" of the timing diagrams 'A' and 'B' in FIG. 13, respectively) by an amount indicated by 'SAVE TIME'.

This may be because the currently requested ISP operation of the timing diagram 'C' may have been requested in the past and thus the resulting data QDATA may be stored in the non-volatile memory device 150 according to the previously requested ISP operation as described with reference to the timing diagram "B".

Therefore, in the timing diagram 'C', the output of the resulting data QDATA from the non-volatile memory device 150 to the host 102 may serve as a response to the currently requested ISP operation. Therefore, the completion of the entire process in the timing diagram may be earlier than the completion of the entire process in the timing diagram 'A' or 'B' by the amount indicated by 'SAVE TIME'.

Figure 14:
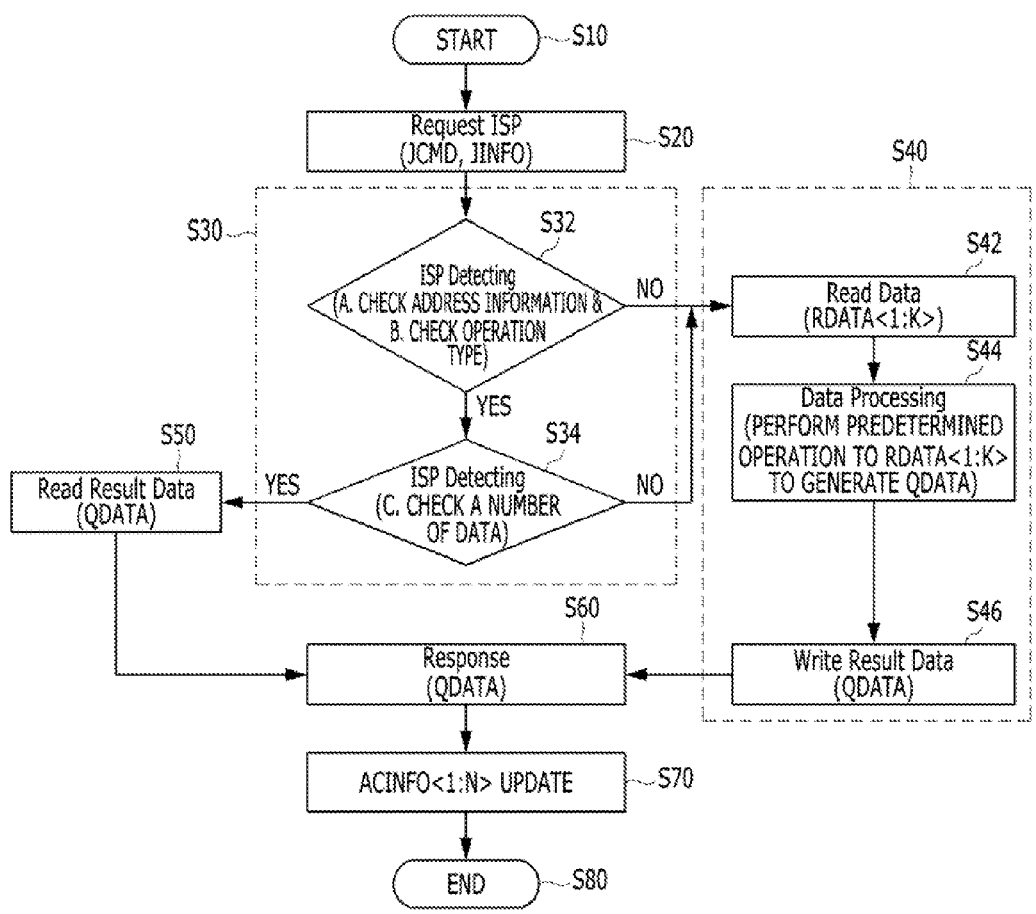
FIG. 14 is a flowchart illustrating an in-storage processing (ISP) operation of a memory system shown in FIGS. 12A to 12C.

FIG. 14 is a flowchart illustrating an example of an ISP operation of the memory system 110 shown in FIGS. 12A to 12C.

Referring to FIG. 14, the memory system 110 may receive the command JCMD requesting the ISP operation and the process information JINFO for the currently requested ISP operation at step S20.

At step S30, the memory system 110 may determine whether the currently requested ISP operation is also requested in the past.

For example, the memory system 110 may compare the process information JINFO for the currently requested ISP operation with the cumulative operation information ACINFO<1:N> stored in the memory 144 within the controller 130 at steps S32 and S34.

During comparison between the process information JINFO for the currently requested ISP operation with the cumulative operation information ACINFO<1:N> at step S30, the memory system 110 may perform the first and second comparison operation to the process address information and the requested operation information of the process information JINFO for the currently requested ISP operation and the cumulative operation information ACINFO<1:N>, respectively at step S32.

When the process address information and the requested operation information of the process information JINFO for the currently requested ISP operation are the same as the process address information and the requested operation information of the cumulative operation information ACINFO<1:N>, respectively, as a result of step S32 ("YES"), the memory system 110 may then determine whether a number of data corresponding to the process address information of the cumulative operation information ACINFO<1:N> which is determined to be the same as the process information JINFO for the currently requested ISP operation at step S32, is the same as a number of data corresponding to the process address information of the process information JINFO for the currently requested ISP operation at step S34.

When the number of data corresponding to the process address information of the cumulative operation information ACINFO<1:N>, which is determined to be the same as the process information JINFO for the currently requested ISP operation at step S32, is not the same as the number of data corresponding to the process address information of the process information JINFO for the currently requested ISP operation as a result of step S34 ("NO") it may be determined that the currently requested ISP operation is not requested in the past and step S40 may be performed.

When the number of data corresponding to the process address information of the cumulative operation information ACINFO<1:N>, which is determined to be the same as the process information JINFO for the currently requested ISP operation at step S32, is the same as the number of data corresponding to the process address information of the process information JINFO for the currently requested ISP operation as a result of step S34 ("YES") it may be determined that the currently requested ISP operation is also requested in the past and step S50 may be performed.

When either the process address information or the requested operation information of the process information JINFO for the currently requested ISP operation is not the same as the process address information or the requested operation information of the cumulative operation information ACINFO<1:N>, respectively, as a result of step S32 ("NO"), it may be determined that the currently requested ISP operation is not requested in the past and step S40 may be performed.

During step S40, the memory system 110 may read out the data RDATA<1:K> from the non-volatile memory device 150, according to the process information JINFO for the currently requested ISP operation at step S42. The memory system 110 may generate the resulting data QDATA by performing the preset operation to the data RDATA<1:K> at step S44. The memory system may store the resulting data QDATA in the non-volatile memory device 150 at step S46, and may output the resulting data QDATA to the host 102 at step S60.

At step S50, the memory system 110 may read out the resulting data QDATA from the non-volatile memory device 150, according to the process information JINFO for the currently requested ISP operation at step S50. The memory system 110 may output the read-out resulting data QDATA to the host 102 at step S60.

When the memory system 110 outputs the read-out resulting data QDATA to the host at step S60, the memory system 110 may update the cumulative operation information ACINFO<1:N> at step S70 and may end the ISP operation at step S80.

As described above, according to an embodiment of the present invention a memory system suitable for performing ISP may detect a frequently performed ISP operation, and independently store resulting data of the detected ISP operation. Then, the memory system may simplify the ISP operation by reading out the resulting data during the same ISP operation. Therefore, the memory system may greatly reduce the operation time required for the frequently repeated ISP operation.

While the present invention has been described with respect to certain embodiments, it will be apparent to those skilled in the art that various changes and modifications may be made without departing from the spirit and scope of the invention as defined in the following claims.

What is claimed is:

1. A memory system comprising:
a non-volatile memory device; and
a controller suitable for checking an operation information of a requested ISP operation by a host, and performing a first ISP operation when the requested ISP operation is not requested in the past, or performing a second ISP operation when the requested ISP operation is also requested in the past,
wherein during the first ISP operation the controller reads out data from the non-volatile memory device according to the operation information of the requested ISP operation, generates a resulting data by performing a preset operation to the read-out data, outputs the resulting data to the host, and stores the resulting data in the non-volatile memory device, and
wherein during the second ISP operation the controller outputs the read-out resulting data corresponding to the requested ISP operation from the non-volatile memory device to the host.

2. The memory system of claim 1,
wherein the controller cumulatively stores the operation information as a cumulative operation information of the requested ISP operation during the first ISP operation, and
wherein the controller determines whether the requested ISP operation is also requested in the past by comparing the operation information of the requested ISP operation with the cumulative operation information.

3. The memory system of claim 2, wherein the controller cumulatively stores the operation information as the cumulative operation information, of the ISP operation previously performed as the first ISP operation in response to previous request from the host prior to the requested ISP operation to a maximum number of N (N is an integer greater than 2).

4. The memory system of claim 3, wherein when the part of the memory storing the cumulative operation information is full, the controller deletes the oldest hit operation information and stores the operation information of the requested ISP operation as the cumulative operation information during the first ISP operation.

5. The memory system of claim 2,
wherein the data are stored in a first region of the non-volatile memory device, and the controller stores the resulting data in a second region of the non-volatile memory device.

6. The memory system of claim 5,
wherein the controller stores the cumulative operation information in a preset storage space therein, and the controller backs up the cumulative operation information stored in the preset storage space to a third region of the non-volatile memory device at power-off of the memory system.

7. The memory system of claim 2,
wherein the operation information of the requested ISP operation includes a process address information representing each location of the data in the non-volatile memory device, and a requested operation information representing a type of the preset operation corresponding to the requested ISP operation, and
wherein each of the cumulative operation information further includes a resulting address information representing each location of the resulting data in the non-volatile memory device.

8. The memory system of claim 7, wherein the controller determines whether the requested ISP operation is also requested in the past by comparing the process address information between the operation information of the requested ISP operation and the cumulative operation information, and selectively comparing the requested operation information between the operation information of the requested ISP operation and the cumulative operation information according to a result of the comparing of the process address information.

9. The memory system of claim 8, wherein, during the comparing of the process address information, the controller determines that the process address information between the operation information of the requested ISP operation and the cumulative operation information have different values when numbers of the data represented by the process address information between the operation information of the requested ISP operation and the cumulative operation information is different from each other.

10. The memory system of claim 7, wherein the preset operation includes:
an operation of joining the read-out data together; and/or
an operation of comparing the read-out data with one another.

11. An operation method of a memory system including a non-volatile memory device the operation method comprising:
checking an operation information of a requested ISP operation when a host provides a request of ISP operation;
performing a first ISP operation when the requested ISP operation is not requested in the past as a result of the checking of the operation information;
storing a resulting data of the first ISP operation in the non-volatile memory device; and
performing a second ISP operation when the requested ISP operation is also requested in the past as a result of the checking of the operation information,
wherein the first ISP operation includes reading out data from the non-volatile memory device according to the operation information of the requested ISP operation, generating the resulting data by performing a preset operation to the read-out data, and outputting the resulting data to the host, and
wherein the second ISP operation includes outputting the read-out resulting data corresponding to the requested ISP operation from the non-volatile memory device to the host.

12. The operation method of claim 11, wherein the checking of the operation information includes:
cumulatively storing the operation information as a cumulative operation information of the requested ISP operation during the first ISP operation; an
determining whether the requested ISP operation is also requested in the past by comparing the operation information of the requested ISP operation with the cumulative operation information.

13. The operation method of claim 12, wherein the cumulatively storing of the operation information may be performed by cumulatively storing the operation information, as the cumulative operation information, of the ISP operation during which the resultant data is previously stored in the non-volatile memory device through the performing of the first ISP operation and the storing of the resultant data in response to previous request of the ISP operation from the host, prior to the requested ISP operation to a maximum number of N (N is an integer greater than 2).

14. The operation method of claim 13 herein when the part of the memory storing the cumulative operation information is full, the cumulatively storing of the operation information deletes the oldest hit one among the operation information in the cumulative operation information and may store the operation information of the requested ISP operation as the cumulative operation information during the first ISP operation.

15. The operation method of claim 12,
wherein the data are stored in a first region of the non-volatile memory device 150, and
wherein the storing of the resulting data may be performed by storing the resulting data in a second region of the non-volatile memory device.

16. The operation method of claim 15, wherein the cumulatively storing of the operation information includes:
storing the cumulative operation information in a preset storage space other than the non-volatile memory device; and
backing up the cumulative operation information stored in the preset storage space to a third region of the non-volatile memory device at power-off of the memory system.

17. The operation method of claim 12,
wherein the operation information of the requested ISP operation includes a process address information representing each location of the data in the non-volatile memory device, and a requested operation information representing a type of the preset operation corresponding to the requested ISP operation, and
wherein each of the cumulative operation information further includes a resulting address information representing each location of the resulting data in the non-volatile memory device.

18. The operation method of claim 17, wherein the checking of the operation information determines whether the requested ISP operation is also requested in the past by comparing the process address information between the operation information of the requested ISP operation and the cumulative operation information, and selectively comparing the requested operation information between the operation information of the requested ISP operation and the cumulative operation information according to a result of the comparing of the process address information.

19. The operation method of claim 18, wherein, during the comparing of the process address information, the checking of the operation information determines that the process address information between the operation information of the requested ISP operation and the cumulative operation information have different values when numbers of the data represented by the process address information between the operation information of the requested ISP operation and the cumulative operation information is different from each other.

20. The operation method of claim 17, wherein the preset operation includes:
   an operation of joining the read-out data together; and
   an operation of comparing the read-out data with one another.

* * * * *